United States Patent [19]

Shaw et al.

[11] Patent Number: 5,706,290

[45] Date of Patent: Jan. 6, 1998

[54] METHOD AND APPARATUS INCLUDING SYSTEM ARCHITECTURE FOR MULTIMEDIA COMMUNICATION

[76] Inventors: Venson Shaw, 11 Yellow Brook Rd., Marlboro, N.J. 07746; Steven M. Shaw, 111 Reldyes Ave., Leonia, N.J. 07605

[21] Appl. No.: 516,603

[22] Filed: Aug. 18, 1995

Related U.S. Application Data

[63] Continuation of Ser. No. 356,486, Dec. 15, 1994, abandoned.

[51] Int. Cl.$^6$ ................................................. G06T 1/00
[52] U.S. Cl. .................. 370/465; 395/806; 348/390; 348/586; 358/426; 382/232; 364/514 A
[58] Field of Search ....................... 370/465–468, 370/230–231; 395/612, 114, 888, 327–328, 806–807, 200.01–200.21, 800, 501, 502, 507, 516, 285; 348/384–459, 586, 589; 358/426–433; 382/166, 232–253, 305; 375/240–241; 364/514 A, 514 R

[56] References Cited

U.S. PATENT DOCUMENTS

| | | | |
|---|---|---|---|
| 5,164,938 | 11/1992 | Jurkevich et al. | 370/231 |
| 5,457,780 | 10/1995 | Shaw et al. | 395/502 |
| 5,546,324 | 8/1996 | Palmer et al. | 364/514 R |
| 5,600,844 | 2/1997 | Shaw et al. | 395/800 |
| 5,611,038 | 3/1997 | Shaw et al. | 395/806 |

*Primary Examiner*—Joseph H. Feild
*Attorney, Agent, or Firm*—Clifford G. Frayne

[57] ABSTRACT

A controller apparatus and method for executing a plurality of control functions for communication of multimedia articles including voice, audio, text, still image, motion video and animated graphics which incorporates a frame memory system which is compatible with multiple standard or customized coding algorithmic signals such as H.261, MPEG, JPEG, EDTV or HDTV or in multiple incompatible video coding equipment employing different video coding algorithms can now freely communicate with each other, the controller apparatus further including a band width management function for automatically scaling the multimedia article signal to conform to available band width.

30 Claims, 26 Drawing Sheets

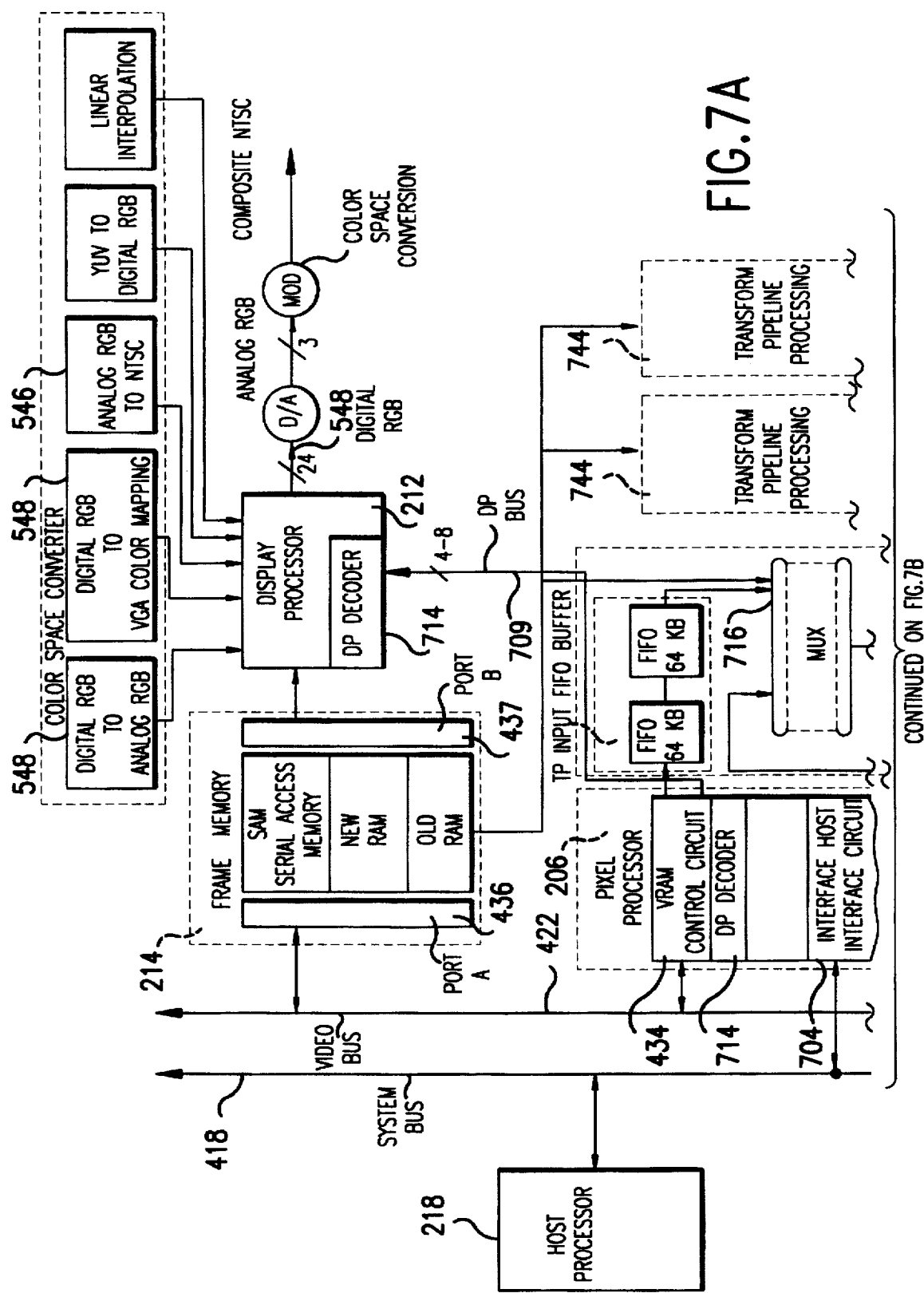

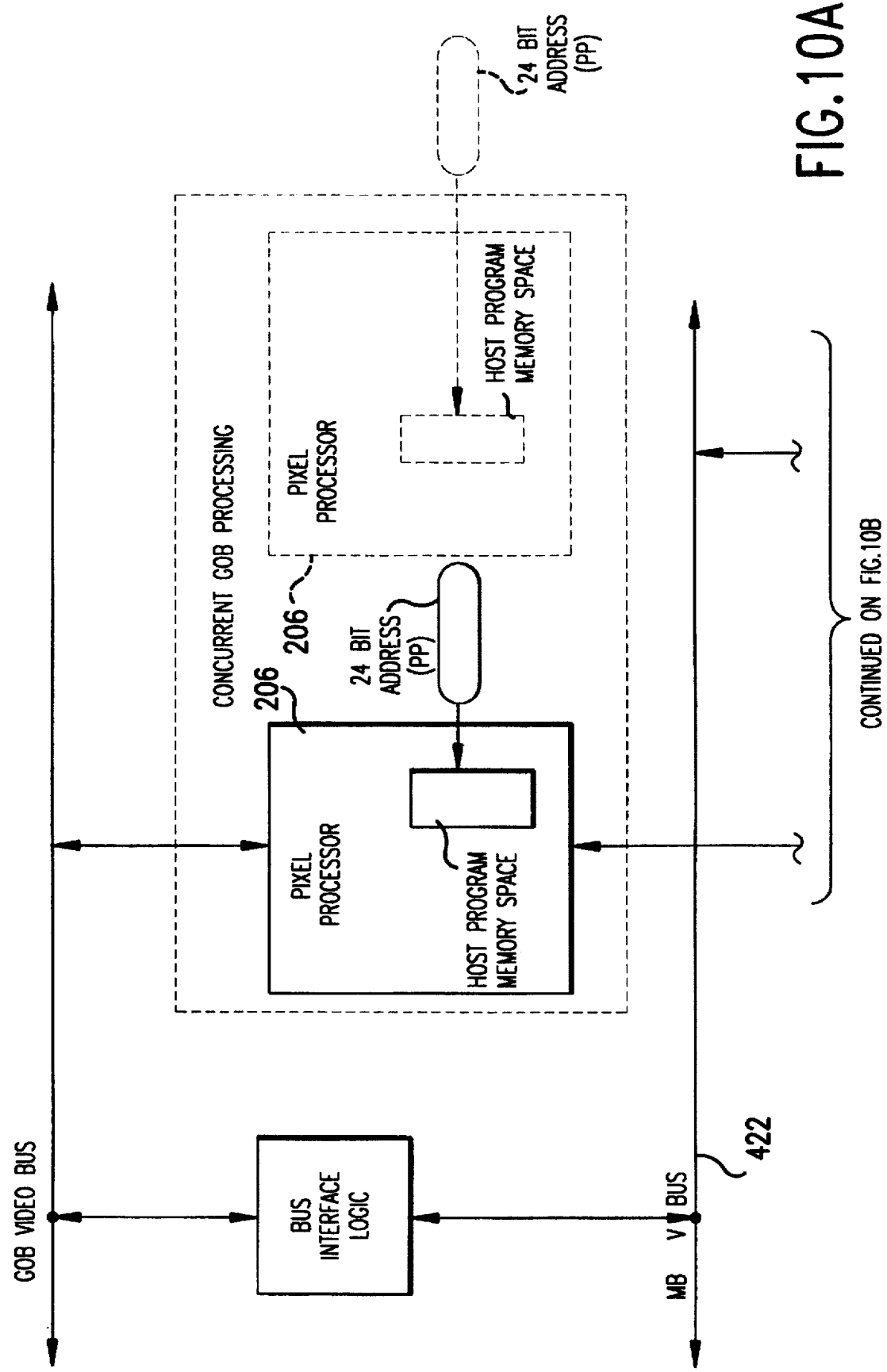

5,706,290

METHOD AND APPARATUS INCLUDING SYSTEM ARCHITECTURE FOR MULTIMEDIA COMMUNICATION

This is a continuation of application Ser. No. 08/356,486, filed Dec. 15, 1994, now abandoned.

FIELD OF INVENTION

The present invention relates to a method and apparatus for improving the efficiency of electronic communication and, in particular, to a method and apparatus which can communicate with available electronic desk top equipment, such as personal computers, workstations, video cameras, television, VCR's, CD players and telephones and receive, store, process and send multiple forms of media information, such as sound, image, graphics, video and data, both digitally and algorithmically based on a plurality of selective band widths.

BACKGROUND OF THE INVENTION

Technology allows the individual to communicate with others not only by the telephone, but also by telefax machines, personal computers and workstations utilizing modems and telephone lines and data and video information can also be stored and disseminated by means of videotapes, compact discs and television monitors.

There are methods and apparatus available which allow for large amounts of data to be reduced and transmitted in a very short amount of time, such methods and apparatus are known as compressing the data. Similarly, there are methods and apparatus available for enhancing the image quality of visual and graphic data that has been compressed and is now being displayed. For example, see U.S. Pat. No. 4,772,947 to Kono; U.S. Pat. No. 4,703,350 to Hinman; U.S. Pat. No. 4,727,589 to Hirose; U.S. Pat. No. 4,777,620 to Shimoni; U.S. Pat. No. 4,772,946 to Hammer; and U.S. Pat. No. 4,398,256 to Nussmier.

While the aforesaid patents teach various methods and apparatus for compressing and decompressing data and enhancing the image quality of the data, none of the aforesaid patents have directed themselves to the concept and structure of a method and apparatus which would communicate with and share resources among the telephone, personal computer or workstation, video screen and VCR to allow the individual to select and convey multiple forms of media information such as sound, image, graphics, data and live video in an efficient and effective architecture which would automatically adjust to available band widths and which would be capable of communicating in multiple band widths.

OBJECTS OF THE INVENTION

An object of the present invention is to define an integrated process architecture which can accommodate communications, both transmission and retrieval, of all digitally-coded or algorithmic multimedia information.

Another object of the invention is to provide for a novel system architecture which is flexible and allows control of the variable communications band widths and allows for flexible combinations of digitally-coded multiple media information having application to teleconferencing or educational instruction.

A still further object of the present invention is to provide for a novel process architecture which not only allows for digital coding techniques, but also can interface with traditional analog storage or transmission techniques.

A still further object of the present invention is to provide for a novel, process architecture which allows the user to control program and select the appropriate media combination either before or during the communication session.

SUMMARY OF THE INVENTION

An apparatus and method for multimedia communications including voice, audio, text, still image, motion video and animated graphics which permits communications between multimedia transmitters and receivers and which is compatible with multiple standard or customized coding algorithmic signals such as H.261, MPEG, JPEG, EDTV or HDTV whereby multiple incompatible video coding equipment employing different video coding algorithms can now communicate with each other and which includes a reconfigurable memory for selectively adjusting the internal file format and size so as to be compatible with any available band width.

BRIEF DESCRIPTION OF THE DRAWINGS

These and other objects of the present invention will become apparent particularly when taken in view of the following illustrations wherein.

DETAILED DESCRIPTION OF THE DRAWINGS

Figure 1:
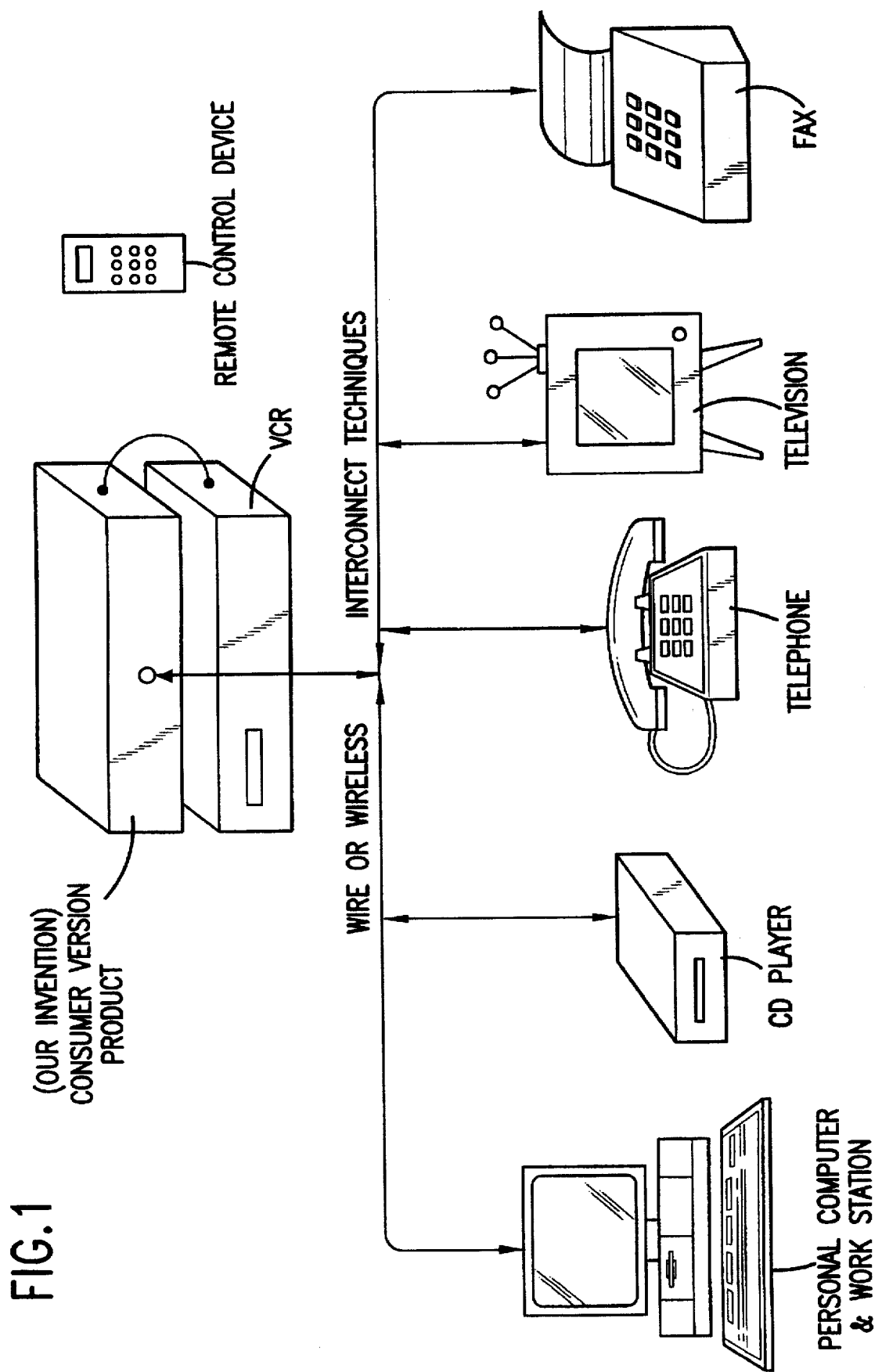
FIG. 1 is a pictorial illustration of the communication system.

Referring to FIG. 1, there is shown a pictorial illustration depicting the communication devices available presently for the home or office. These include a VCR 102, CD player 103, telephone 104, television 106, personal computer 108 and fax machine 110. Each of these communication devices has a distinct function. The telephone can transmit and receive audio and data; a fax machine can transmit and receive text documents, a television can receive video broadcasts and audio; and a personal computer can be used for many data processing applications. It is Applicant's intention to disclose an assembly which can physically communicate with these electronic devices to permit them to function complimentary with each other and to communicate with other electronic devices regardless of whether the other communication devices were digital or algorithmic and to code and decode automatically to the available band width. The communication is accomplished by a multimedia communications assembly 112, being of size and shape, similar to that of a VCR. The aforementioned electronic devices would interconnect with the multimedia communications assembly 112 to allow the user/operator to control, complement and utilize the functions of the electronic devices by means of the multimedia communications assembly 112.

Figure 2A:
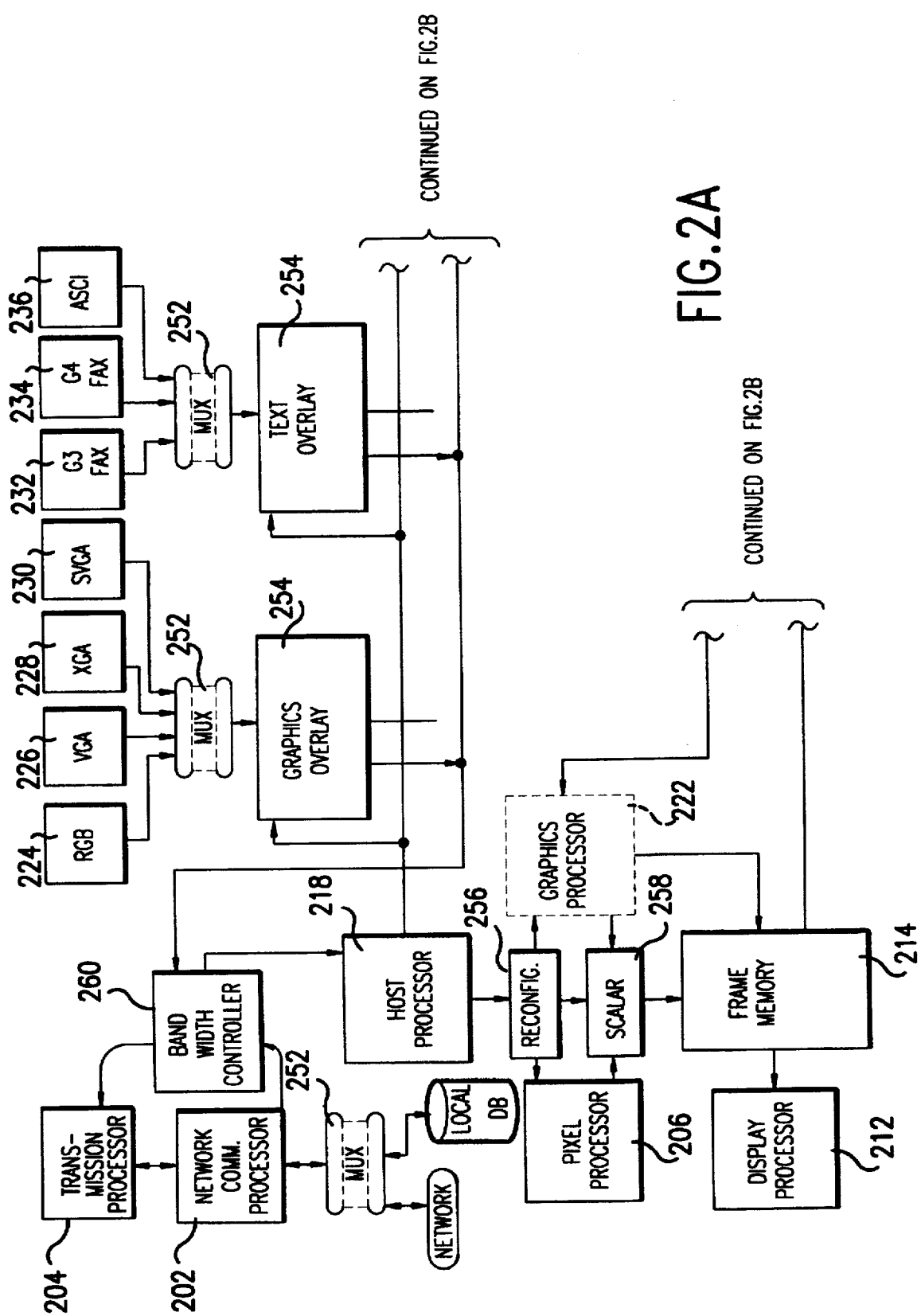
FIG. 2 is a schematic diagram illustrating the overall system methodology.
Figure 2B:
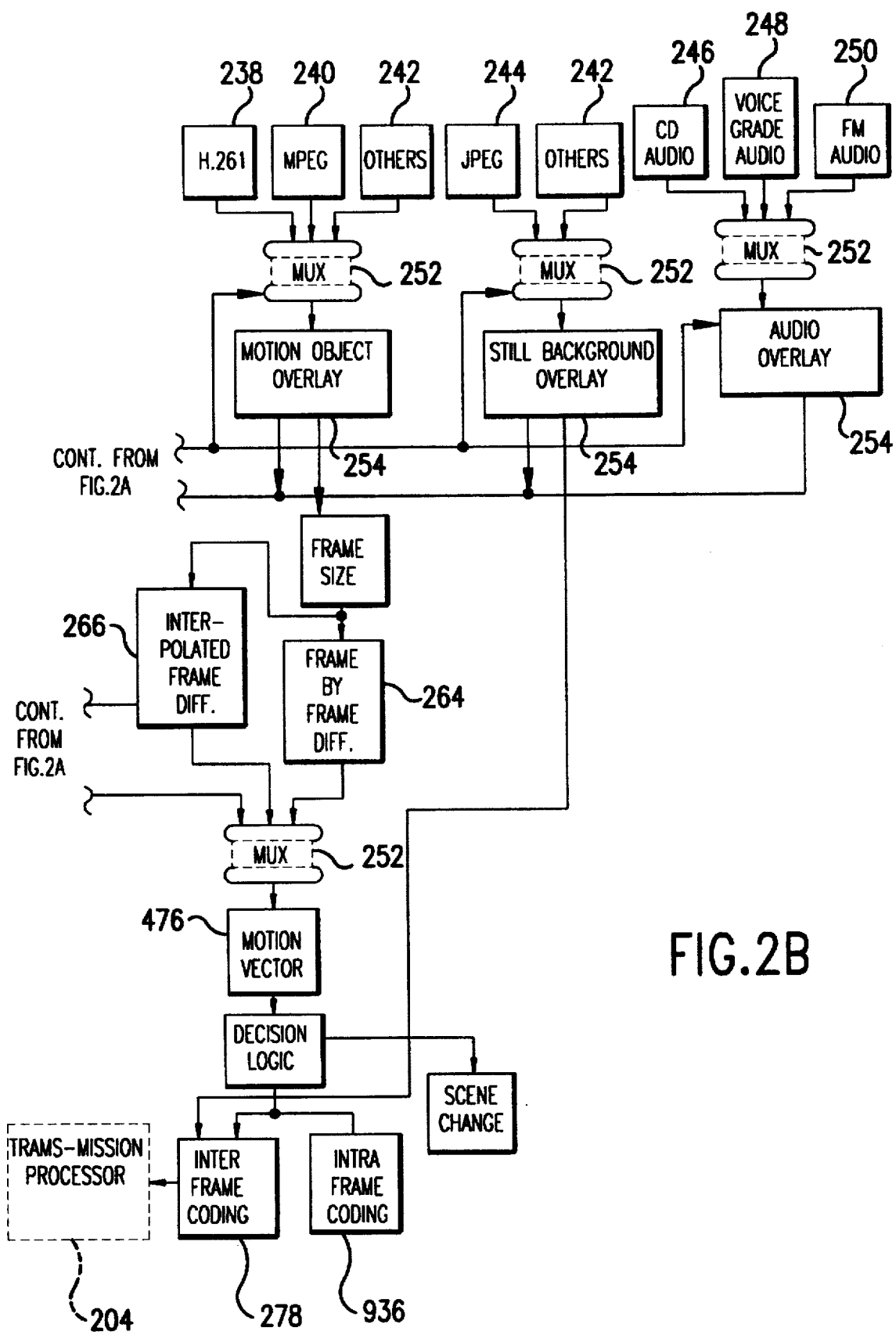

FIG. 2 illustrates the overall system operation and methodology for the multimedia communications assembly 112. Assembly 112 makes it possible to exchange a multitude of different forms of media objects over a wide range of communication networks. Prior art has shown methods and apparatus to improve compression and decompression techniques for individual media types and individual band width ranges. However, since video coding algorithms are intrinsically incompatible with each other, there is need for an assembly 112 to provide a common interface whereby incompatible equipment can freely exchange media objects through interfacing with assembly 112.

The schematic methodology illustrated in FIG. 2 comprises the following major system components. They are a network communications processor 202; a transmission processor 204; a pixel processor 206; a motion processor 208; a transform processor 210; a display processor 212; a capture processor 220; a frame memory 214 and a host processor 218.

The design of the system architecture as described in detail hereafter is to gain the ability to interface with multiple types of media objects, including audio, still image, motion video, text and graphics. As illustrated in FIG. 2, graphics input might possibly be in the form of an RGB format 224; VGA format 226; XGA format 228; or SVGA format 230. Text media objects could be either in the form of a Group 3 format 232; Group 4 format 234; or ASCI format 236. Motion media objects may conform either to H.261 format 238; MPEG format 240; or other specialized formats 242. Still background media objects could be conforming either to JPEG format 244 or other specialized formats 234. Input audio media objects could be conformfing to CD audio format 246; voice grade audio 248 or FM audio format 250.

Each media object within a category, namely, audio, still image, motion video, text and graphics would be imported to a multiplexer 252 dedicated to each category in order to identify the input signal and then be directed to a dedicated overlay 254 for each category of media object. The overlay 254 provides the ability for the assembly, disassembly, deletion, addition and modification of a selected group of multimedia objects. The input signals, be they audio, still image, motion video, text or graphics, are converted into computer object-oriented language format for encoding into a frame memory 214 as described hereafter. This conversion before storing into frame memory 214 in cooperation with the major components of the system described hereafter, permit the compilation of selected input signals which have been stored in the frame memory 214 to be assembled, interpreted and translated to other system formats with relative ease as a result of the intelligent memory management capability inherent in this design.

The system architecture provides for an interface which will enable multiple incompatible video coding equipment employing different video coding algorithms to communicate. This is accomplished through a scalable frame memory architecture reconfigurable technique (SMART) described in FIG. 9.

In simplistic terms to be described in detail hereafter, the design of assembly 112 allows host processor 218 to identify the types of input articles during the import stage, the host processor will then instruct the reconfiguration circuit 256 and the scaler circuit 258 to provide the required down-sampling ratio. The media article being imported can then conform or be reduced to the internal file format during the import stage. The reverse is true during the exporting stage when the media article in the internal file can be enlarged and made to conform to the appropriate algorithm for the exporting stage. As a result of our smaller internal file size, the real time performance requirement of our pixel processor 206, graphics processor 222, transform processor 210 and motion processor 208 is reduced. Further, the speed and size of the frame memory 214 is also proportionately reduced. This design allows various coding algorithms to be microcoded at pixel processor 206.

Assembly 112 also optimizes the video coding for specific compression ratios in order to meet specific band width requirements. In order to adjust the band width to meet the various communication network requirements, band width controller 260 receives the band width requirement from the network communication processor 202, the band width controller 260 will then instruct the host processor 218 to develop the appropriate compression ratio in order to meet the real time performance requirements. Band width controller 260 will also interface with transmission processor 204 in order to import and export the media article at the appropriate band width. Assembly 112 can program the network communication processor 202, the transmission processor 204 and the display processor 212 to provide the various types of communications interfaces.

The internal operation modes of host processor 218 permit it to adapt to different compression ratio requirements and network band width requirements. As an example, the following are some popular network band width interfaces:

1. Communicating over an analog phone line employing V.32 modem, 9,600 bit per second (bps) band width is required, a quarter common immediate frame (QCIF) format is displayed at 7.5 frames per second (fps).

2. Communicating over a digital ISDN D channel at 16 kilo bits per second (kbs). The user has two options, either two quarter common intermediate frame (QCIF) formats can be displayed at 7.5 frames per second or one quarter common intermediate frame can be displayed at 15 frames per second.

3. Communicating over an analog phone line whereby 19,200 bit per second band width is required. The user has two options, either two QCIF (common intermediate frame) formats can be displayed at 7.5 frames per second or one QCIF (quarter common intermediate frame) can be displayed at 15 frames per second.

4. Communicating over switched 56 kilo bits per second digital network. Quarter common intermediate frames with three quality level options will be updated at 15 frames per second.

5. Communicating over a single ISDN B channel over an ISDN basic rate interface network, four quarter common intermediate frames will be concurrently updated at 15 frames per second.

6. Communicating over a dual ISDN B channel in a ISDN basic rate interface network, quarter common intermediate frames will be transmitted at 30 frames per second.

7. Communicating over a 384 kilo bits per second ISDN H1 network, common intermediate frame Will be transmitted at 15 frames per second.

8. Communicating over a 1.544 kilo bits per second T1 network, common intermediate frames (CIF) will be transmitted at 30 frames per second.

As a result of the aforesaid plurality of band widths, it is necessary for the multimedia assembly to continuously monitor the processor and network band width availability and to simultaneously determine the amount of compression or decompression that is required with respect to the data in frame memory 314 to be transmitted. Due to the variable band width or throughput requirement for each transmission network, only dedicated processor approaches have been shown in the prior art to meet a specific band width performance. For example, three video conferencing techniques are required at the 112 Kbs, 384 Kbs and 1.544 Mbs band width range. The multimedia assembly disclosed herein, includes different transceiver pairs for each specific network type. The system architecture disclosed herein, and in particular, host processor 218 in conjunction with band width controller 260 unit, scaler 258 and reconfiguration unit 256, can continuously adapt to a variety of network and processor band width changing situations, for example, noisy local line condition and network traffic congestion. This is possible as a result of the scalable memory architecture which permits the continuous reprogramming of the internal file format of frame memory 214 so that it is suitable for the specific band width requirement at that moment.

During the interframe coding mode 278, after the incoming media articles are received, the appropriate frame size 262 will be adjusted first, frame by frame difference 264 will then be calculated. For consecutive frame processing, an appropriate motion vector 270 can be derived. For selective frame processing, due to the difficulty to identify a suitable motion vector 270, interpolation techniques 266 can be employed to simulate frame difference signal. Decision logic 272 is employed to analyze situation and make a final decision. In case of scene changes, system will be reset to intraframe coding mode for further processing. A detailed design of the motion processor 208 is further shown in FIG. 11.

Although our invention entitled "multimedia", we have been mostly focued on "new hardware and software techniques" for the "motion video". In addition, we have also shown new techniques how to integrate (overlay) motion video with other media article in order to create a complete multimedia presentation. Since there have been plenty of prior arts showing techniques to handle other media, i.e., CD audio, fax, telephone, computer graphics, or digital camera. Also because the performance requirement for these media types are much less demanding. Therefore, the encoding and decoding of other media types in our invention can be easily implemented in general purpose computer hardware and software, embedded hardware controller, or special purpose digital-signal processors.

Figure 3:
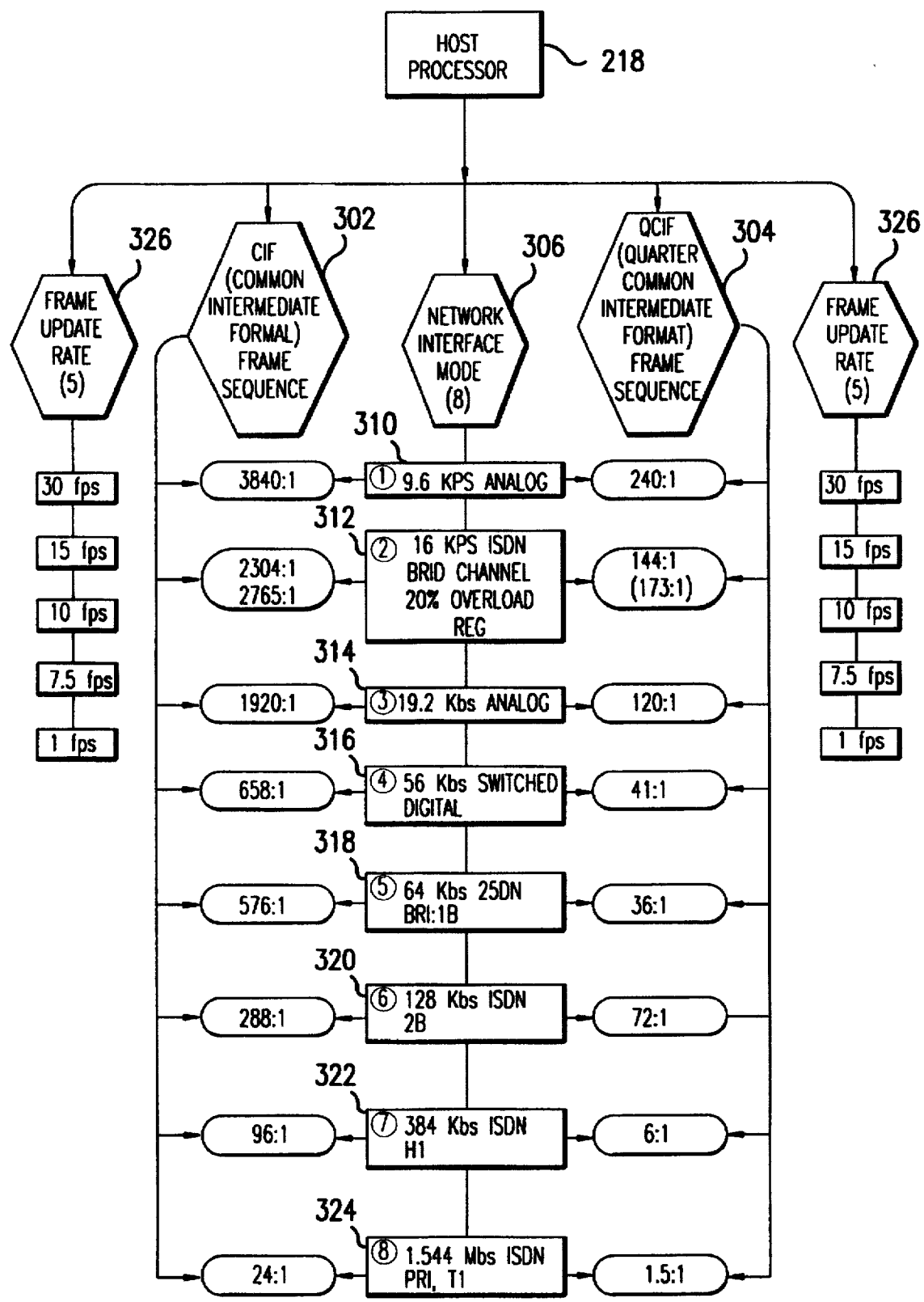
FIG. 3 is a schematic of the controller's internal operating mode for illustrating band width management.

FIG. 3 is a schematic illustration of the controller's operating modes for band width management based upon the international compression standard CCITT H.261. Based upon this standard, each common intermediate format frame (CIF frame) 302 consists of twelve (12) groups of blocks and each group of blocks would consist of thirty-three (33) macro-blocks with each macro-block consisting of six (6) blocks (4 Y's and 2 U/V's). Each block would consist of 8×8 pixels and each pixel would consist of an 8 bit value. The quarter common intermediate format frame (QCIF frame) 304 would consist of three groups of blocks and these would be identical to those of the CIF's 302.

In multimedia assembly 112, host processor 218 has eight (8) different network interface modes 306. The first interface mode 310 is for 9.6 Kbs analog modems. The second interface mode 312 is for 16 Kbs ISDN D channel. The third network interface mode 314 is for 19.2 Kbs high speed analog modems. The fourth network interface mode 316 is for 56 Kbs digital network (PSDN). The fifth network interface mode 318 is for 64 Kbs ISDN single B channel. The sixth network interface mode 320 is for dual B channel 128 Kbs ISDN BRI network. The seventh network interface mode 322 is for 384 Kbs ISDN H1 network and the eighth network interface mode 324 is for 1.544 Mbs ISDN PRI or T1 network.

Host processor 218 also has programmable frame updating rate capability 326. Frame updating rate 326 provides host processor 218 with five options. They can be either 30 frame per second (fps); 15 fps; 10 fps; 7.5 fps or 1 fps.

The standard frame update rate 326 for each network interface mode 306 would be 1 fps for first network interface mode 310; 1.5 fps for second network interface mode 312; 2 fps for third network interface mode 314; 6.5 fps for fourth network interface mode 316; 7.5 fps for fifth interface mode 318; 15 fps for sixth and seventh interface mode 320 and 322, respectively and 30 fps for eighth interface mode 324.

In FIG. 3, we have established 30 fps of frame update rate 326 as the default update rate for CIF format 302 transmission and 7.5 fps as the default update rate for QCIF format 304 transmission. The compression ratios illustrated in FIG. 10 and described hereafter are for this default update rate.

The CIF format 302 system throughput requires 4.6 mega bytes per second (MBS). The QCIF format 304 requires 288 kilo bytes per second. Assuming we use 8 kilo bytes per second as the measuring base for real time video transmission over fifth network interface mode 318, the CIF format 302 system would require a compression ratio of 576:1 based upon the CCITT H.261 compression standard. The QCIF format 304 would require a 36:1 compression ratio. Similarly, with respect to the other network interface modes 306, the compression ratios would be as follows: The eighth network interface mode 324 would require a CIF format 302 compression ratio of 24:1 whereas QCIF format 304 would require a 1.5:1 compression ratio; seventh network interface mode 322 would require a CIF format 302 compression ratio of 96:1 and a QCIF format 304 ratio of 6:1; fourth network interface mode 316 would require a CIF format 302 compression ratio of 658:1 and a QCIF format 304 ratio of 41:1; third network interface mode 314 would require a CIF format 302 compression ratio of 1,920:1 and a QCIF format 304 ratio of 120:1; the first network interface mode 310 would require a CIF format 302 ratio of 3,840:1 and a QCIF format 304 ratio of 240:1.

As a standard operation in Applicant's multimedia assembly, single QCIF format 304 will be employed for the first through fifth network interface modes 310, 312, 314, 316 and 318, respectively. Double OCIF format will be employed for sixth network interface mode 320 and single CIF format 302 or quadruple QCIF format 304 sequences will be utilized for the seventh and eighth network interface modes 322 and 324.

Figure 4A:
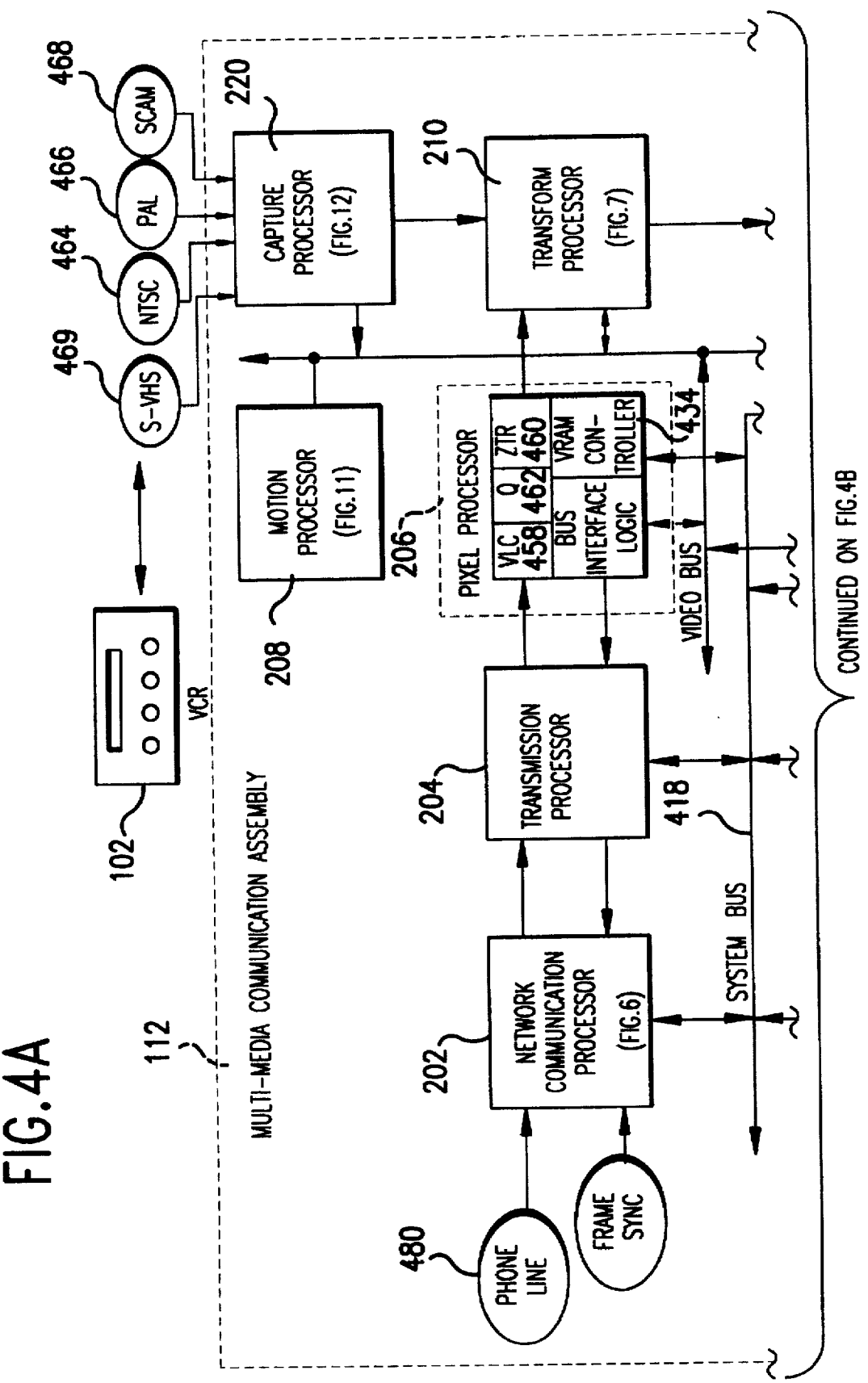
FIG. 4 is a schematic of the internal circuitry of the multimedia communications assembly.
Figure 4B:
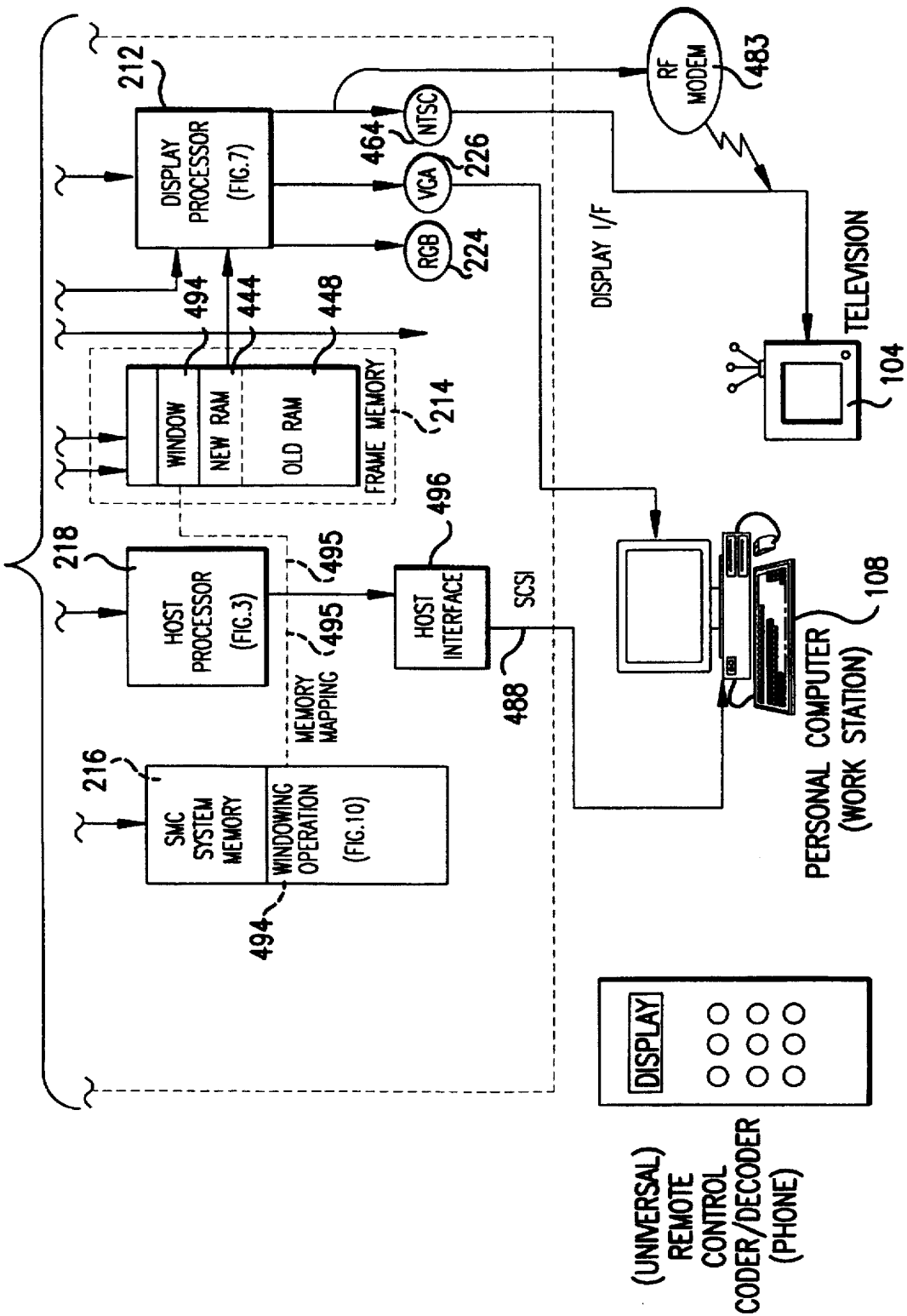

The advantages of Applicant's multimedia communications assembly 112 and its operation and capabilities will be discussed hereafter. FIG. 4 illustrates a schematic view of the multimedia communications assembly 112. It consists of the following major system components. They are a network communications processor 202; a transmission processor 204; a pixel processor 206; a motion processor 208; a transform processor 210; a display processor 212; a capture processor 220; a frame memory 214 and a host processor 218. These system components can be implemented either using custom integrated circuit devices, a programmable integrated circuit; microprocessor; microcontroller; digital signal processor or software, depending upon the specific system performance requirement.

The system components are interconnected through a system host bus 418 and a high speed video bus 422. The system host bus 418 allows the host processor 218 to control access and communicate with the system components such as the network communication processor 202, the transmission processor 204, the pixel processor 206, and the frame memory 214. The video bus 422 interconnects the frame memory 214 with such components as the capture processor 220, the display processor 212, the transform processor 210, the pixel processor 206 and the motion processor 208 to perform high speed video signal processing functions. Both the system host bus 418 and the video bus 422 are bi-directional parallel buses.

Due to the real time performance requirements for the high speed video frame processing, two system-wide interconnections are implemented. The first is the video pipeline 424 consisting of a direct interconnection between the capture processor 220, pixel processor 206, motion processor 208, transform processor 210, frame memory 214 and display processor 212. The second system interconnect 342 consists of the direct interconnection between the network communication processor 202, transmission processor 204, host processor 218 and pixel processor 206. In order to facilitate these interconnect operations, first in, first out memory devices 428 are inserted where appropriate.

The frame memory 214 can be implemented either in static random access memory 430 or video random access memory 434. The static random access memory 430 is easier to implement, but at a higher cost. The video random access memory (VRAM) 434 is less expensive, but slower than the static random access memory 430 and requires a controller 434 to update the memory array. The video random access memory 434 is provided with two access ports 436 and 437 providing access to the random accessible memory array. This is done since many video coding algorithms employ frequent use of the interframe coding 440 to reduce band widths. Namely, only the frame difference signal 442 will be transmitted. Therefore, the twin memory accesses are required to store both the new frame 444 and the old frame 448 and to facilitate frame differencing operations 450. In this design, the pixel processor 206 serves as the bus master 420 for the video bus 422 by having the video random access memory (VRAM) controller 434 function positioned within the pixel processor 206 core. This allows pixel processor 206 the ability to control video bus 422 and to access video random access memory pixel storage for pixel level operations 454. Pixel processor 206 also is equipped with the bit level manipulation functions 456 such as variable length coder and decoder (VLC) 458, scan format converter 460 and quantization converter 462. These permit the pixel processor to utilize international video coding algorithms for communicating as discussed hereafter.

The capture processor 220 can decode various types of analog video input formats and convert them (e.g., NTSC 464, PAL 466, SCAM 468, or SVHS 469) to CCIR 601 470 YUV 471 4:2:2 472. The ability of the capture processor 220 to decode the aforesaid formats provide for a convenient interface between the multimedia communications assembly 112 and the television 106, VCR 102 or video camera 465.

The CIF 302 formulated YUV 471 signals will first transfer out of the capture processor 220 and store in the frame memory 214. The luminance (Y) signal 474 will be loaded into the motion processor 208 to perform motion estimation 475. A motion vector 476 will be developed for each macro block 477 and store in the associated frame memory 214 location. The difference between the new and old macro blocks will also be coded in discrete cosine transform (DCT) coefficients 478 using the transform processor 210. Pixel processor 206 will perform a raster to zig-zag scan conversion 460, quantization 462 and VLC coding 458 of the DCT coefficients 478 for each macro block 477 of luminance 474 and chrominance 473. The transmission processor 204 will format the CIF 302 frames into the CCITT H.261 238 format and attach the appropriate header 481 information. As an example, a CIF frame 302 will partition into twelve groups of blocks 482 and each group of blocks 482 will consist of thirty-three macro blocks 477 and each macro block 477 will be composed of four luminance signals 474, and one U & V signal 473. The network communication processor 202 will provide the control interface to the telecommunications network 480 or to a microwave link 483.

On the receiving side, the serial compressed video bit stream 484 will be received from the network communication processor 202. The bit stream will be converted from serial to parallel and decode the appropriate header message 481 using the transmission processor 204. The information will then be sent to the frame memory 214 through pixel processor 206. Pixel processor 206 will then perform a variable length decoder 458, zig-zag-to-raster scan conversion 460 and dequantization 463. The YUV 471 macro block 477 of DCT coefficients 478 will be sent to frame memory 214 through pixel processor 206. Pixel processor 206 will then send YUV 471 macro blocks 477, one at a-time to the transform processor 210 to perform inverse DCT operation 485. The YUV 471 difference 450 will then be added to the old signal 452 to conform to a new YUV pixel 446 for each macro block 477. The display processor 212 will then perform YUV 471 to RGB 224 conversion and generate analog signal from the RGB 224 or thence generate an 8 bit VGA 226 color image through color mapping 486. The display processor 212 will then provide a convenient interface to various displays such as television 106, personal computers 108 or monitor.

For ease of interface, host processor 218 also provides for a high speed small computer system interface (SCSI) 488 with the external host 487 such as a personal computer or work station. The advantage of the small computer system interface 488 is that it provides a system independent interface between the external host 487 and the multimedia communications assembly 112. Since only simplified control messages 489 are required to pass between the two hosts, modifications to the system to provide for various operation formats such as DOS 491, UNIX 490 or Macintosh 492 can easily be accomplished. The high speed small computer system interface 488 will also allow the transmission of video sequences between the two hosts.

In the case of high speed digital network communication, the communication pipeline is employed to facilitate real time frame formatting 410, protocol controlling 412, transmission and decoding. The host processor 218 is the bus master 420 for the system bus 418. Consequently, host processor 218 will be able to access to the frame memory 214 and/or system memory 216, and monitor progress through a windowing operation 494. The windowing operation 494 essentially allows a portion of the system memory 216 to be memory mapped 495 to the frame memory 214 so that the host processor 218 can use it as a window to view frame memory 214 status and operations in real time.

Figure 5:
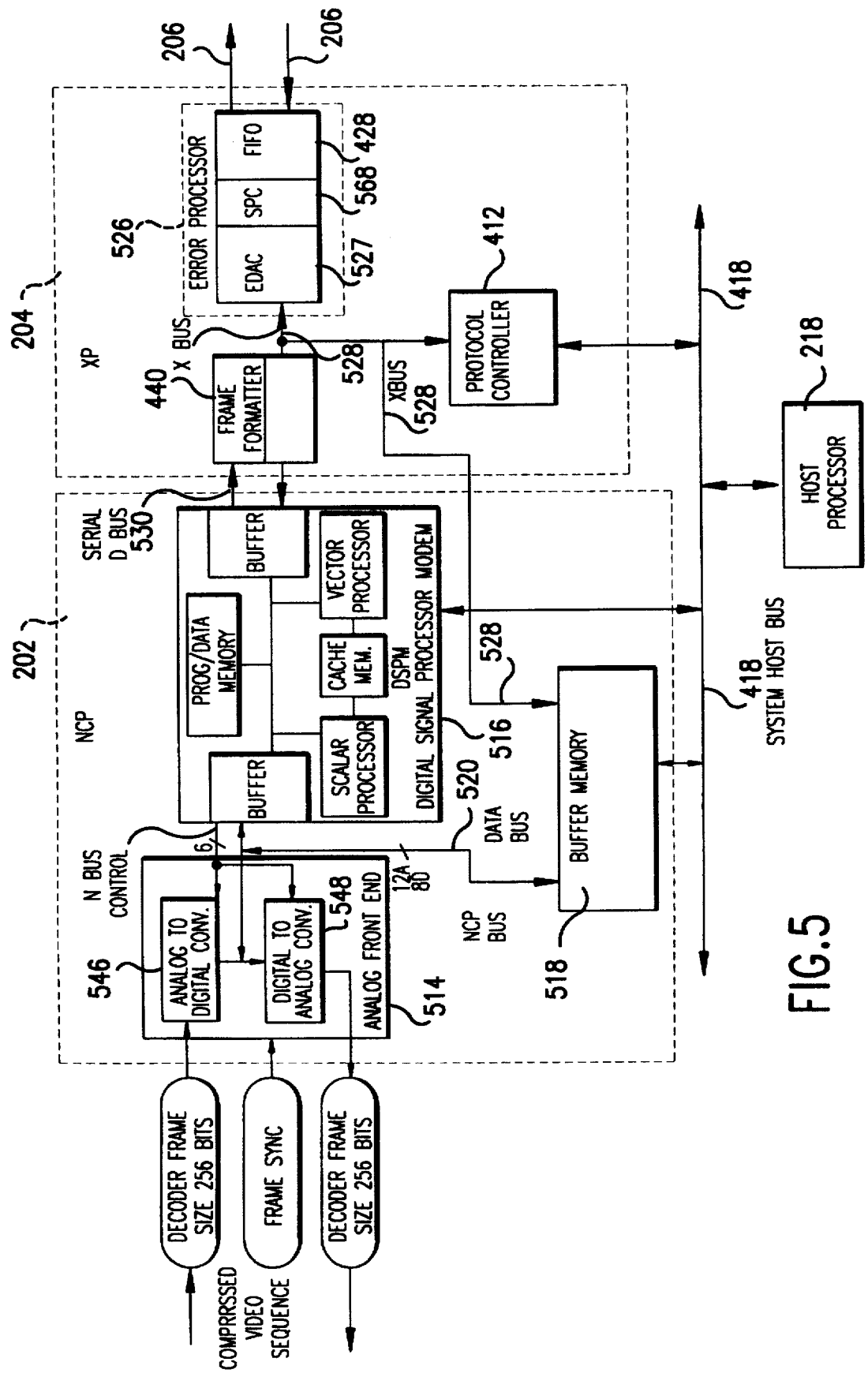
FIG. 5 is a schematic of the network communications processor and its design relationship to the transmission processor.

FIG. 5 illustrates the network communication processor 202 and its design relationship to transmission processor 204. Network communication processor 202 is comprised of an analog front end transceiver 514, digital signal processor modem 516 and a buffer memory 518. These network communication processor 202 components are interconnected through a private NCP bus 520. The transmission processor 204 consists of a frame formatter 522, a protocol controller 524 and an error processor 526. The transmission processor 204 components and the buffer memory 518 are interconnected through another private X bus 528. The bit-serial D bus 530 facilitates the network communication processor 202 and transmission processor 204 communication through digital signal processor modem 516 and frame formatter 522 sub-systems. The private NCP bus 520, D bus 530 and X bus 528 are designed to facilitate effective data addressing and transfer in between the sub-system blocks. Furthermore, the buffer memory 518, digital signal processor modem 516 and protocol controller 524 are interconnected to the host processor 218 through system bus 418.

The specific requirement of the bus design, which may include address 510, data 512 and control 502 sections is dependent upon the data throughput 504, word size 506 and bus contention 508 considerations. The network communications processor 202 implements the DTE 536 function while the host processor 218, and transmission processor 204, perform the DCE 532 function. This allows the proper pairing of the DCE 532 and DTE 536 interfaced to a local customer premises equipment 534 so as to perform conference control 538, store and forward 540 or band width management 542.

Within the network communication processor 202 subsystem, digital signal processor modem 516 is the local host controller 544. Analog front end 514 consists of an analog to digital converter (ADC) 546 and a digital to analog converter (DAC) 548. The analog-to-digital converter 546 samples and holds the analog input signal 550 and converts it to a digital bit stream. The digital-to-analog converter 548 buffers the digital output bit streams and converts them into an analog output signal. The analog front end is the front end interface to the telephone network 480 from the system. The output digital bit stream from the analog-to-digital converter 546 is then transferred to the buffer memory 518 for temporary storage. The digital signal processor modem 516 will access this information through buffer memory 518 to perform line coding functions. Inside the digital signal processor modem 516 is a programmable digital signal processor 552. Digital signal processor 552 is programmable allowing for easy implementation of line coding 554 and control 556 functions for many of the analog front end 514 functions.

Within the transmission processor 204 sub-system, the frame formatter 522 first received the incoming information frame 558 and header message 481 from the digital signal processor modem 516 and identifies the proper receiving video coding algorithm types 560. Protocol controller 524 then takes over and starts the appropriate protocol decoding 562 procedures. Once the control frame 564 and information frame 558 header information are fully decoded, the information frame 558 is sent to the error processor for error checking and correction. Corrected bit streams are then converted from serial to parallel form using serial to parallel converter 568 and are stored in the first in and first out buffer 428 for further processing. The first in, first out buffer 428 is designed into four 32K bits section. Each section allows for storage of 32K bits which is the maximum allowance of a compressed CIF frame. Therefore, 128K bits in the first in, first out buffer allows double buffering and simultaneous transmitting and receiving of the incoming and outgoing video information frames.

In order to accommodate the various network environments, the network communications processor is designed to operate in the following specific speeds.

9.6 Kbps (Kilo bits per second), 19.2 Kbps, 56 Kbps, 64 Kbps, 128 Kbps, 384 Kbps, 1,544 Mbkps (mega bits per second) and 2.048 Mbps. HP will offer three options as the standard modes of operation. In mode 2, single CIF or four QCIF sequences will be offered at 384 Kbps and higher. In mode 3, two QCIF sequences will be offered simultaneously at 128 Kbps.

When line conditions degrade, the analog front end 514 will become aware of the degradation as a result of incoming frame synchronous signal 570. Analog front end 514 will then notify the digital signal processor modem 516 and host processor 218. Host processor 218 will then switch from a standard operation to an exception operation mode. Host processor 218 has three options to lower the bit rate in order to accommodate and correct the degradation. Option 1 would be for the host processor 218 to notify the pixel processor 206 and select a coarser quantization level 572. Option 2 would be to drop the frame update rate and increase the interpolation rate 574. Option 3 would be to drop from CIF to QCIF 576. When the error processor 526 detects more than two single bit errors, the error processor 526 will notify the pixel processor 206 and host processor 218. Host processor 218 again has two options. Either pixel processor 206 can request for an retransmission or host processor 218 can delete the complete macro block 477 and wait until the next macro block is sent. Meanwhile host processor 218 will send the old macro block 308 from the frame memory 214 and use it to update the display.

Figure 6A:
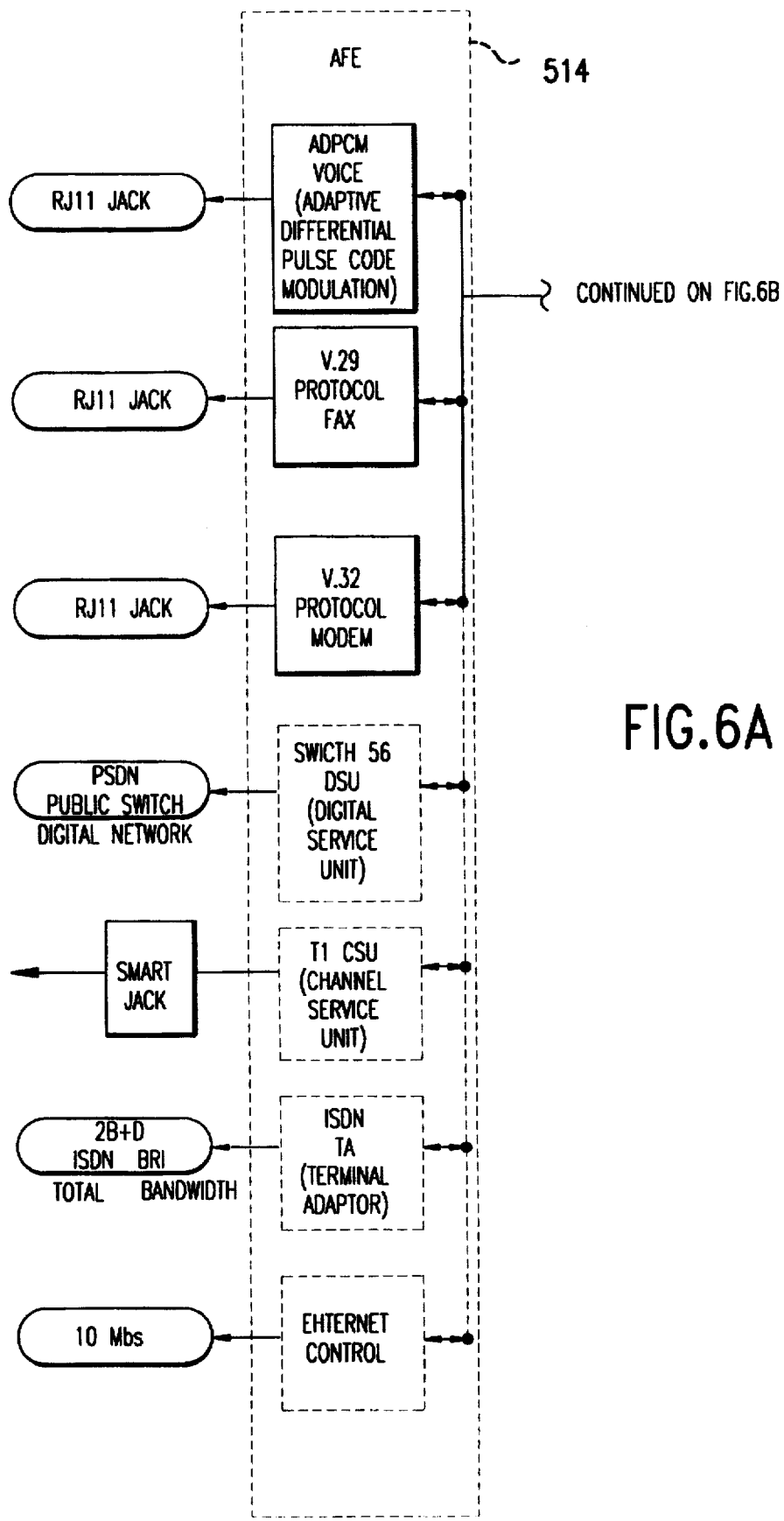
FIG. 6 is a schematic illustrating the communication between the host processor, system memory, pixel processor, frame memory and display processor.
Figure 6B:
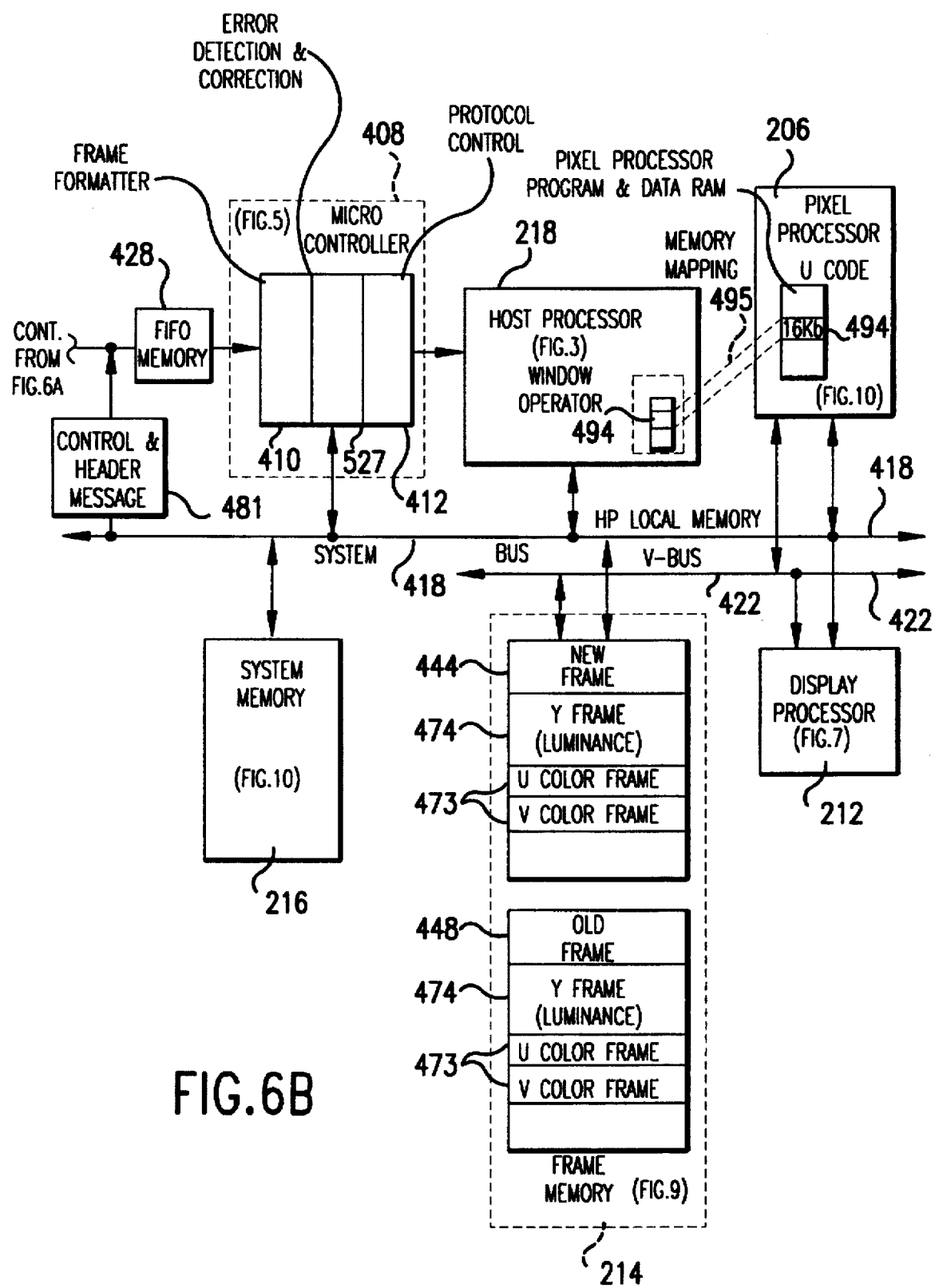

FIG. 6 illustrates the interactions between the front end communication systems and the host processor 218, system memory 216, pixel processor 206, frame memory 214 and display processor 212. These interactions are performed through system bus 418. The incoming video sequence 602 is first received by a front end demodulator 515. Network communications processor 202 and transmission processor 204 will decode the control message and header information 606. The pixel processor 206 and transform processor 210 will then transform these sequences from frequency domain to pixel domain and store same in the frame memory 214. The display processor 212 performs the appropriate interpolation to display the output video sequence at the selected frame rate. Similarly, the outgoing video sequence 603 can be prepared through coding of the frame difference 442 for each macro block 477 to convert from pixel to frequency domain to transmit out through front end modulators 514.

Once the incoming video sequence 602 is received and stored in the buffer memory 518 the control message and header 606 information will then be stored in a first in, first out memory 428 for further decoding by the network communications processor 202 and transmission processor 204. A self-contained micro controller 608 could provide the frame formatting 610, error processing 612 and protocol control functions 524. This would provide service at low bit rate applications up to 64 Kbs range. For higher speed applications 16 bit or 32 bit high performance embedded micro controllers could be employed.

Figure 7B:
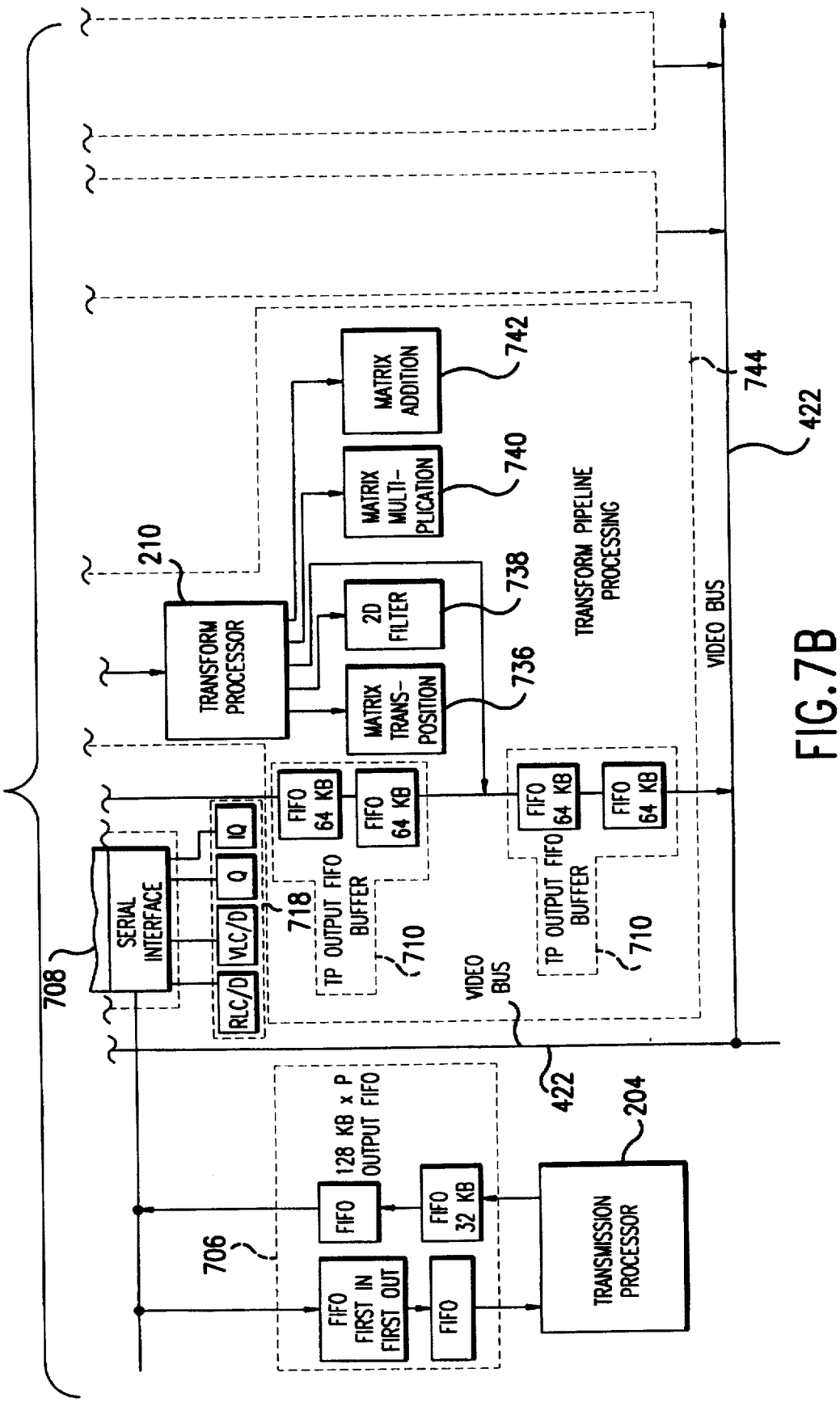
FIG. 7 is a schematic of the video codec and display subsystem.

FIG. 7 illustrates a block diagram of the design of the video codec and display subsystem 702 and its interaction with the transmission processor 204 and host processor 218. The video codec and display subsystem 702 consists of pixel processor 206, transform processor 210, frame memory 214 and display processor 212. Pixel processor 206 is the host controller for the video codec and display sub-system 702. Pixel processor 206 is also the controller for the video bus 422. Pixel processor 206 communicates with the host processor 218 through system bus 418 using its internal host interface circuit 704. Pixel processor 206 also interconnects to transmission processor 204 through a first in, first out memory buffer 706 using its internal serial interface 708. Pixel processor 206 interfaces and controls frame memory 214 through video bus 422 using its internal VRAM controller circuit 434. Pixel processor 206 interfaces with motion processor 208 through video bus 422 and with display processor 212 through private DP bus using its internal display processor decoder 714. The pixel processor 206 also interfaces with transform processor 210 through first in, first out memory 707 and input multiplexer 716.

Pixel processor 206 is also required to perform time critical pixel domain video coder and decoder functions 718. These include variable length coder and decoder, run level coder and decoder, quantization and dequantization, zig-zag to raster or rastar to zig-zag scan conversion.

Since most video coding algorithms employ frame differencing 450 techniques to reduce band width, only the frame difference signals 442 will require to be coded and decoded. Frame memory 214 is designed to store old frames 714 and new frames 712 at two discrete section. Old frame 714 being stored as the reference model while the difference between the new and old frames are being updated via a differencing signal 442 which will be either coded for transmission or decoded and added back to the old frame 714 for the reconstruction of new frame 309.

As an encoder, pixel processor 206 will retrieve from the frame memory 214 these frame differencing signals 442 in macro blocks 477. Transform processor 210 will perform the DCT (discrete cosine transform) function 716 to translate each of the Y, U, and V block from pixel to frequency domain. The pixel processor 206 will apply these discrete cosine transforms to the decoder or encoder function before forwarding the coded bit stream to the transmission processor 204 for transmission.

As a decoder, pixel processor 206 will retrieve these frame difference bit streams 442 from the transmission processor 204 first in, first out buffer 706, apply the decoding procedures, and then communicate with the transform processor 210 through its input first in, first out buffer 707. Transform processor 210 will perform the inverse DCT (discrete cosine transform) operation 485 to derive the pixel domain values for each Y, U and V block 471. These pixel values will be stored in the transform processor output first in, first out 710 until the pixel processor 206 retrieves the old pixel block from frame memory 214. The signal differential will then be forwarded to the pixel processor to update the new values of Y, U and V.

Transform processor 210 also performs matrix transposition 736, two-dimensional filter 738, matrix multiplication 740 and matrix addition 742. These are required since whenever motion compensation techniques are applied, the old frame 714 must be filtered before it can be added to the new frame difference 442. Additionally, the Inverse (Discrete Cosine Transform) 485 output must be transposed before final addition. The double buffered input 707 and output 710 first in, first out memories and the input multiplexer 716 are employed to allow the four stage pipeline required for the discrete cosine transform operation. Additional speed may be obtained through the use of additional transform pipeline processor 744 arranged in parallel.

Figure 8:
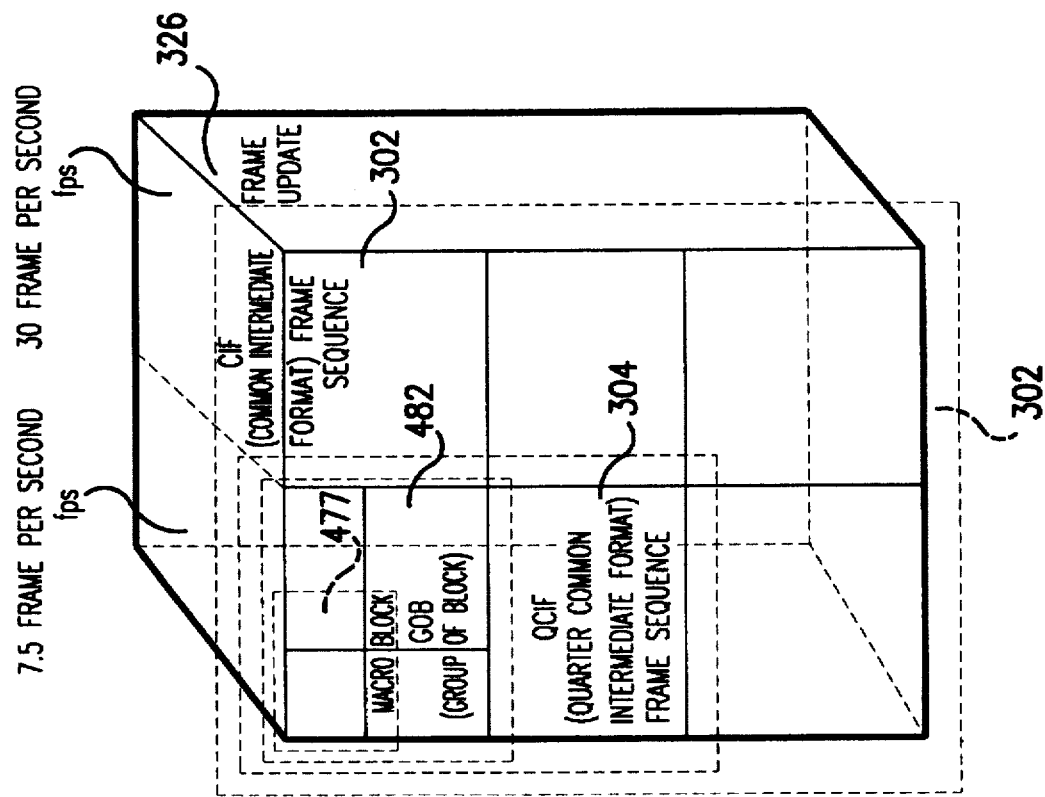
FIG. 8 is a schematic illustration of the standard CIF and QCIF memory format.
Figure 8:
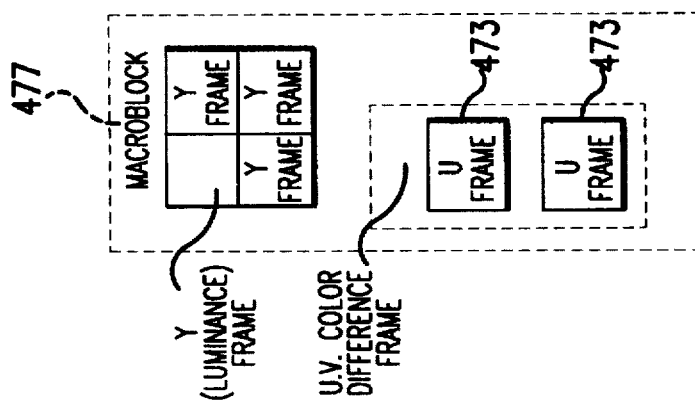

Referring to FIG. 8, as background to Applicant's scalable memory array reconfigurable technique to be described hereafter, an understanding of the CIF format 302 and QCIF format 304 is necessary. These formats are designed for the transportation of video information over a telecommunication network. They are commonly applied by international coding algorithms such as CCITT H.261 238 and MPEG 240 standards.

The CIF format 302 consists of 352 pixels for each horizontal scan line with 288 scan lines on the vertical dimension. The CIF format 302 is further partitioned into twelve groups of blocks 482. Each group of block consists of 33 macro blocks 477 and each macro block consists of 4 Y blocks 474, 1 U block 473 and 1 V block 473 and each block consists of 64 8-bit pixels.

The QCIF format 304 consists of 176 pixels for each horizontal scan line with 144 scan lines on the vertical dimension. The QCIF format 304 is further partitioned into three groups of blocks 482, each group of block 410 consisting of 33 macro blocks 477 with each macro block consisting of 4 Y blocks 474, 1 U block 473 and 1 V block 473.

Each macro block 477 comprises 384 bytes of YUV data since the frame rate for CIF format 302 is 30 fps (frame per second) and each CIF format 302 frame consists of 396 macro blocks. The band width required to send uncompressed CIF format 149 frames would be 4.6 mega bytes per second which is the equivalent to a total of 576 channels of 64 Kbs B channels.

Each QCIF format 304 has 99 macro blocks 477 and frame updates at 7.5 fps. The system throughput requires 288 KBs which is the equivalent of 36 channels of 64 KBs based B channels 802. Therefore, an uncompressed CIF format 302 frame transmitting at 30 fps requires 24 T1 lease lines 804 and the QCIF format 304 transmitting at 7.5 fps requires 1.5 T1 lines 804. As such, 75 micro seconds would be required to code an incoming CIF format 304, 1.2 milliseconds would be required for each macro block at 7.5 fps.

The CCITT H.261 standard 238 requires a switch from inter to intra frame mode after every 132 frames of transmission in order to avoid accumulative error. This means that in a 30 fps transmission, every 4.4 seconds intra CIF format 302 frame coding will be engaged and in QCIF format 304, at 7.5 fps, intra frame coding will be engaged every 17.6 seconds.

Figure 9:
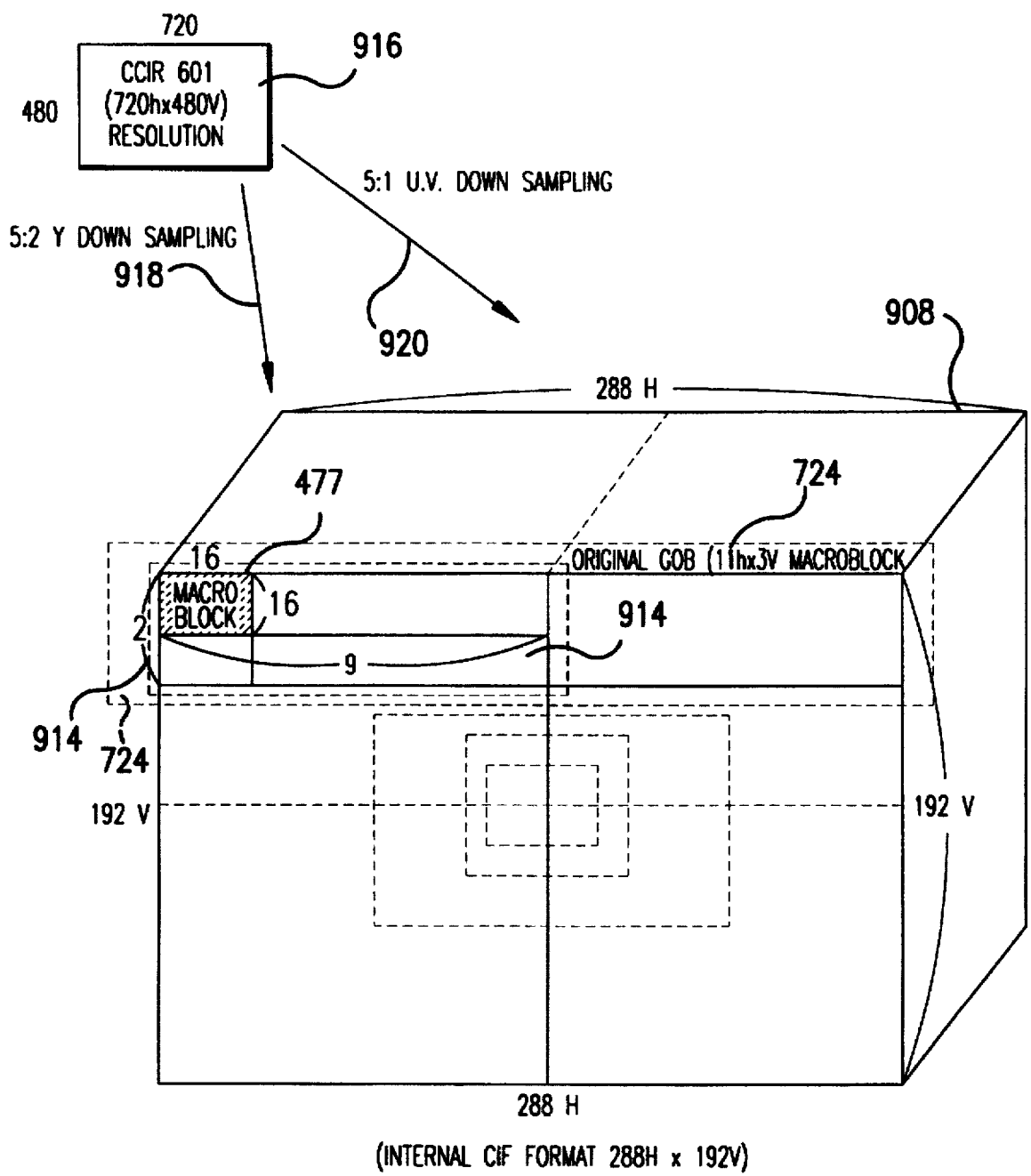
FIG. 9 is a schematic illustration of applicant's scalable memory array reconfigurable technique.

FIG. 9 is a schematic illustration of the scalable memory array reconfigurable technique utilized by Applicant's multimedia assembly 112 in order to optimize the performance for encoding CIF format 302. To achieve 30 fps updates, the time required to encode a macro block 404 is 75 microseconds. A single 8×8 DCT operation will consume 6.4 microseconds. Since it takes 6 DCT operations to complete each 4Y:IU:IV block within a macro block 477, the time required for a single hardware device to execute DCT transform coding will take 38.4 microseconds which would mean that there would only be 36.6 microseconds left for other time demanding tasks such as motion estimation, variable length coding and quantization.

Although pipeline 902 and parallel processing 904 techniques can be applied to improve system performance such as multiple DCT transform pipeline processors 744 can be cascaded in parallel as shown in FIG. 7, this solution is not acceptable for the consumer based mass market.

The scalable memory array reconfigurable technique reduces the standard CIF format 302 to a modified CIF format 906 with slightly coarser resolution and yet retain all of the integrity of the standard CIF format 302 and QCIF format 304. The scalable memory array has the option to choose between the CIF format 302 or QCIF format 304.

The modified CIF format 906 provides a 288h×192v resolution 908 and the modified QCIF format 907 provides a 144h×96v resolution 910. This provides close to the original CIF and QCIF 302 and 304 quality respectively and also maintains the 4:1:1 integrity of the YUV signal 471. Each CIF format 302 will still retain twelve (12) groups of blocks 482 and each QCIF format 151 will still maintain three (3) groups of block 482. The macro blocks 477 and pixel 912 format will remain the same. The only difference is that each group of block 482 will now consist of 18 macro blocks (9h×2V) while the original CIF format 302 group of blocks consisted of 33 macro blocks (11h×3v).

This is accomplished during the input and output color conversion process in that CCIR 601 image 916 input which consists of 720h×480v resolution can be downsampled (5:2) 918 to the 288h×192v Y resolution and further downsampled 5:1 920 to the 144h×96v U, V resolution. At the output display, the Y, U, V can perform 2:5 upsampling 922 for the Y and 1:5 upsampling 924 for the U and V. The significance of this modified CIF format 908 design is that the internal processing performance requirement is reduced by 46% which means we are now allowed to use slower and more economical hardware for encoder processing. Meanwhile, memory subsystems, such as frame memory 214 and first-in, first-out memory 428, can employ slower memory devices that reduce costs.

Secondly, scalable memory array 926 permits the further scaling down of our modified CIF format 908 to meet either application requirements or cost production requirements or to simply drop from a higher resolution format to a coarser resolution format to meet the real time and coding requirement. As an example, the CIF frame format could be implemented at 144h×96v resolution and a QCIF frame format in 72h×48v resolution. Consequently, the multimedia assembly 112 can employ the standard CIF format 302 or QCIF format 304 when cost and performance are acceptable. In other instances, the scalable memory array 926 would be adopted so that the CIF and QCIF formats would be adapted as per the following frame selection examples.

| Mode | CIF | QCIF | TYPE |
| --- | --- | --- | --- |
| 1 | 352h × 288v | 176h × 144v | Standard |
| 2 | 288h × 192v | 144h × 96v | Modified |
| 3 | 144h × 96v | 72h × 48v | Modified |
| 4 | 72h × 48v | 36h × 24v | Modified |
| 5 | 36h × 24v | 18h × 12v | Modified |

The scalable memory array also allows the partition of frame memory 214 into sections of modified frames to allow multiple processes to run in each frame section. As an example, a frame memory 214 of 352h×288v size can be scaled down to either a single 288h×192v section; 4 144h× 98v sections; 16 72h×48v sections: 64 36×24v sections or any of the mixed combinations, all of the sections being processed in parallel.

The scalable memory array can also provide remote MPEG 240 video playback. Standard MPEG provides four times the resolution improvement over the existing CCIR 601 standard. Namely, the standard MPEG 188 can provide 1440h×960v resolution. The significance is now we are not only able to run each memory section as a parallel process, but we are also able to provide compatibility between the two standards MPEG 240 and H.261 238. Now, the MPEG standard 240 designed originally only to provide high resolution motion video playback locally can now be used to transmit compressed MPEG programs across the network employing the widely available H.261 video codec facilities. The scalable memory array also enables the user to manage and provide the remote transmission of MPEG 240 video programs employing conference controller 928, store and forward 930 and video distribution 932.

It is therefore possible to either downsample a compressed MPEG frame 240 into one of the modified CIF format 908 or simply send multiple compressed MPEG subframes by partition. For example, a 1440h×960v MPEG frame 240 can downsample 5:1 into a 288h×192v modified CIF frame 908 for transmission and decode and upsample at 1:5 to display it at standard MPEG resolution at the corresponding output.

As an example, the following frame formats could be utilized to interchange between H.261 238 and MPEG 240 standards.

| Mode | MPEG | Q-MPEG | TYPE |
| --- | --- | --- | --- |
| 1 | 1440h × 960v | 720h × 480v | Standard MPEG |
| 2 | 1152h × 768v | 576h × 384v | Modified MPEG |
| 3 | 576h × 384v | 288h × 192v | Modified MPEG |
| 4 | 352h × 288v | 176h × 144v | Standard CIF/MPEG |
| 5 | 288h × 192v | 144h × 96v | Modified CIF/MPEG |
| 6 | 144h × 96v | 72h × 48v | Modified CIF/MPEG |
| 7 | 72h × 48v | 36h × 24v | Modified CIF/MPEG |
| 8 | 36h × 24v | 18h × 12v | Modified CIF/MPEG |

The scalable memory array formats have significance in that due to their compact size, they become useful in representing moving objects in the foreground when the background information is still. The background information would be pretransmitted during the intra frame coding mode 936, while the different moving objects would be transmitted during the interframe coding mode 938. Depending upon the size of the moving object, the appropriate size of the modified format will be employed. At the decoder end, the moving objects will be overlayed with the still background context to provide motion sequence.

The scalable memory array is particularly suitable to progressive encoding of images when band width needs to be conserved. The scalable memory array will choose the coarser modified CIF format to transmit the initial frames and then utilize a larger modified CIF format to send subsequent frames such that the complete image sequence will gradually be upgraded to the original CIF quality.

The scalable memory array controller performs as a result of the cooperation between pixel processor 206 and host processor 218. Pixel processor 206 is the local host controller for the video codec and display subsystem 702 and the host processor 218 is the global host controller for the overall system. The pixel processor 206 serves as the bus master for video bus 422 and host processor 218 serves as the bus master for the system bus 418. Both the video bus 422 and the system bus 418 are system-wide parallel interconnects. Video bus 422 is specifically designed to facilitate the high speed video information transfer among subsystem components.

Figure 10B:
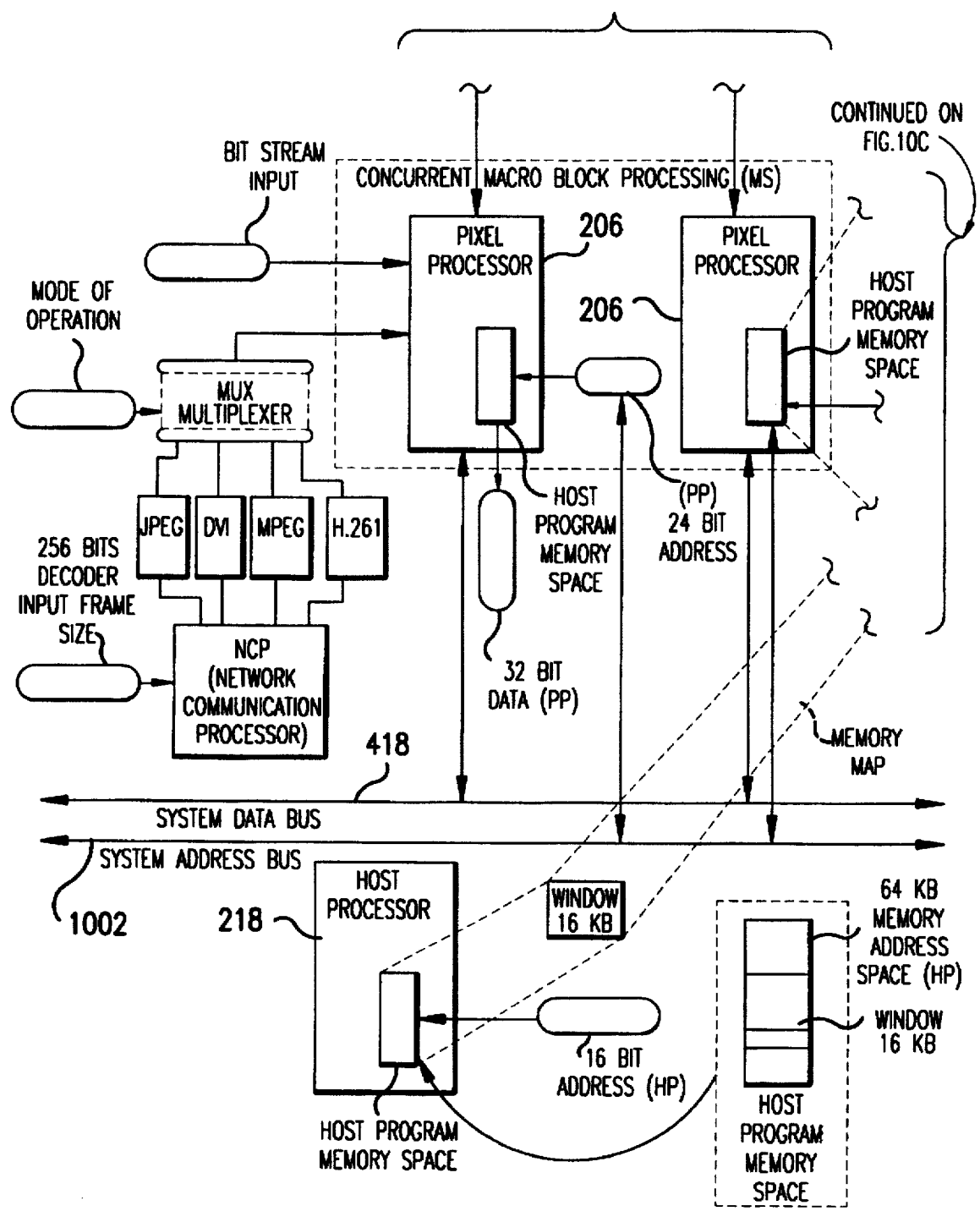
FIG. 10 is a schematic illustrating the pixel processor flexibility to various video coding algorithms.
Figure 10C:
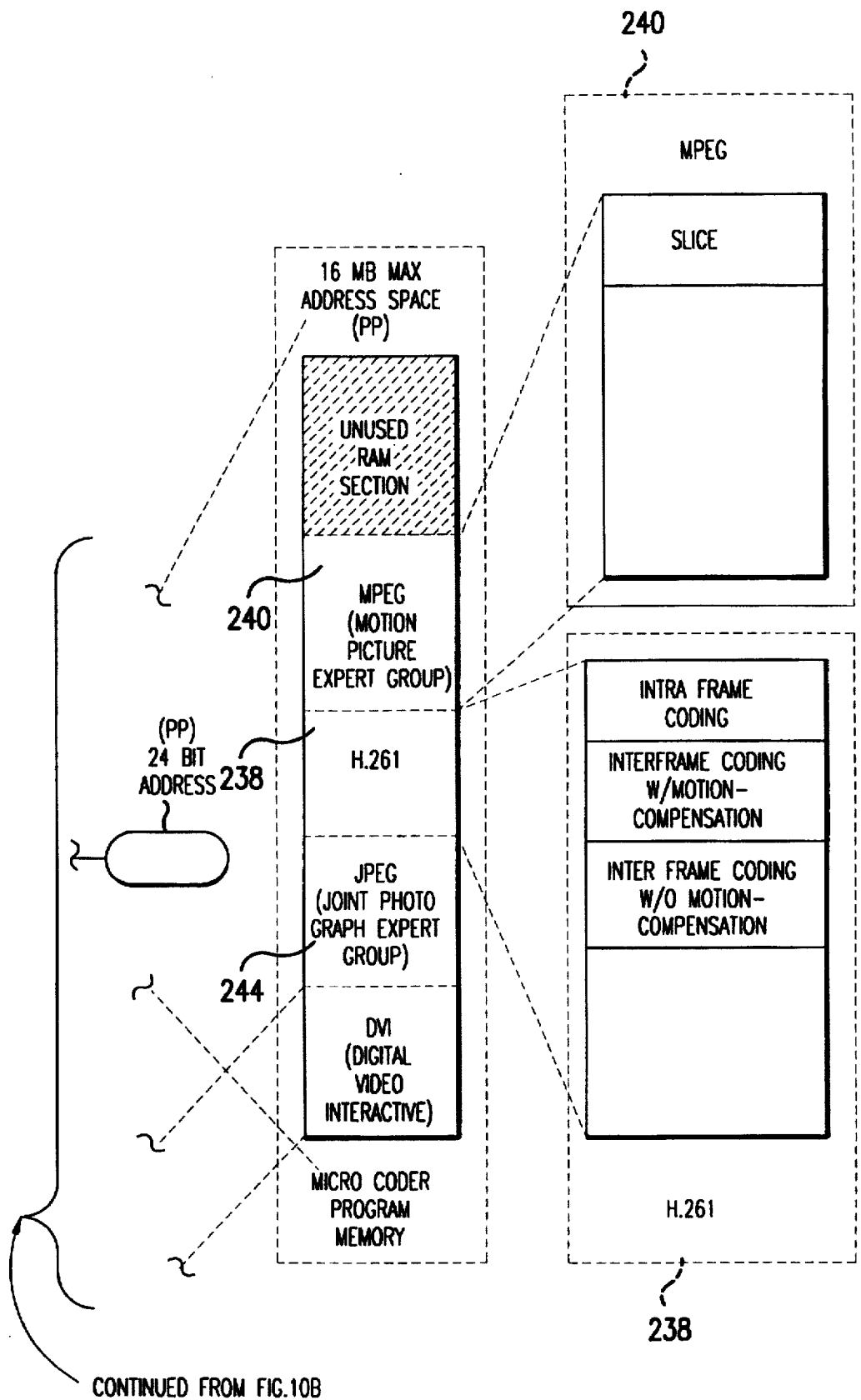
Figure 11A:
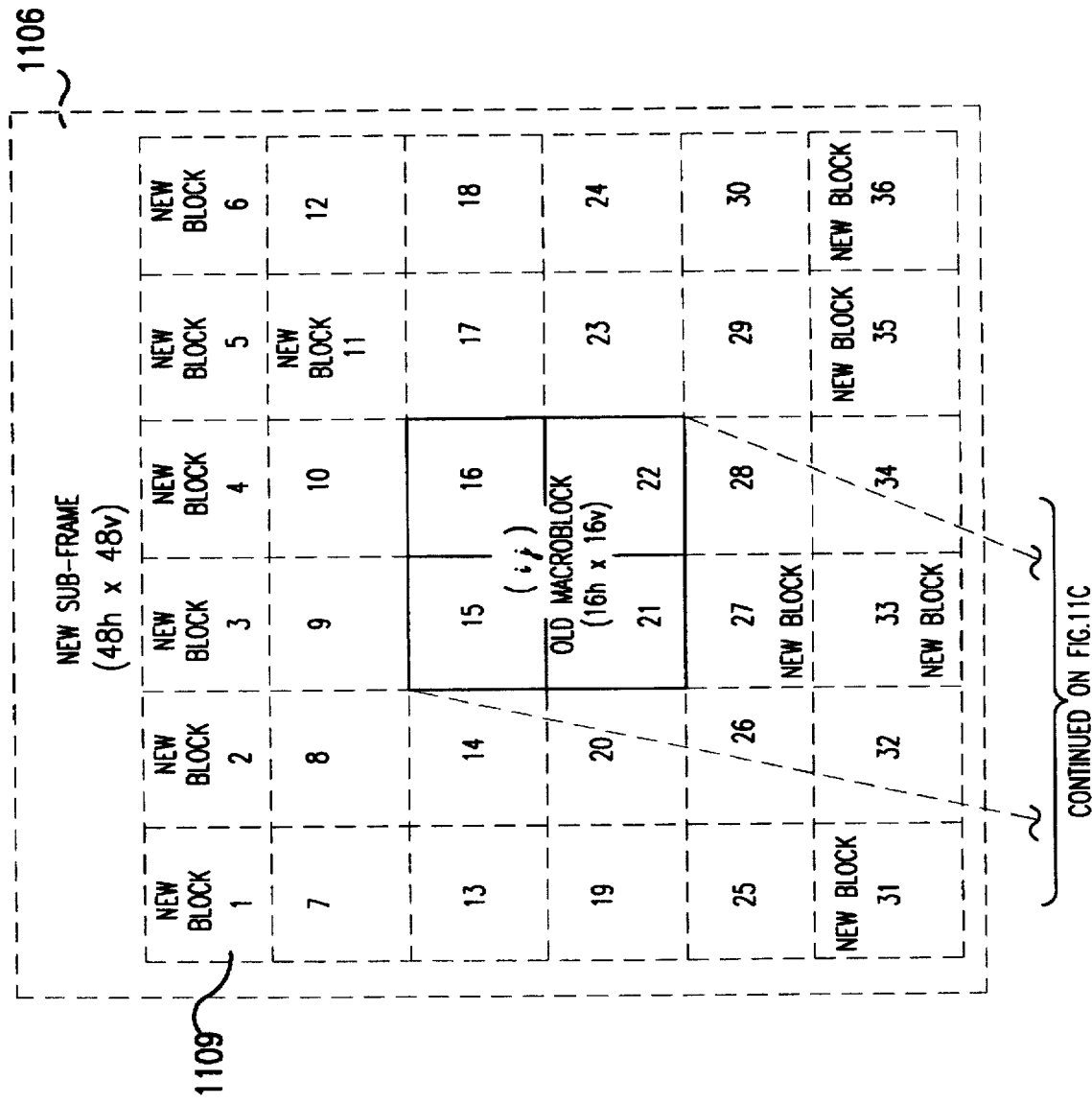
FIG. 11 is a schematic of the motion processor subsystems.
Figure 11B:
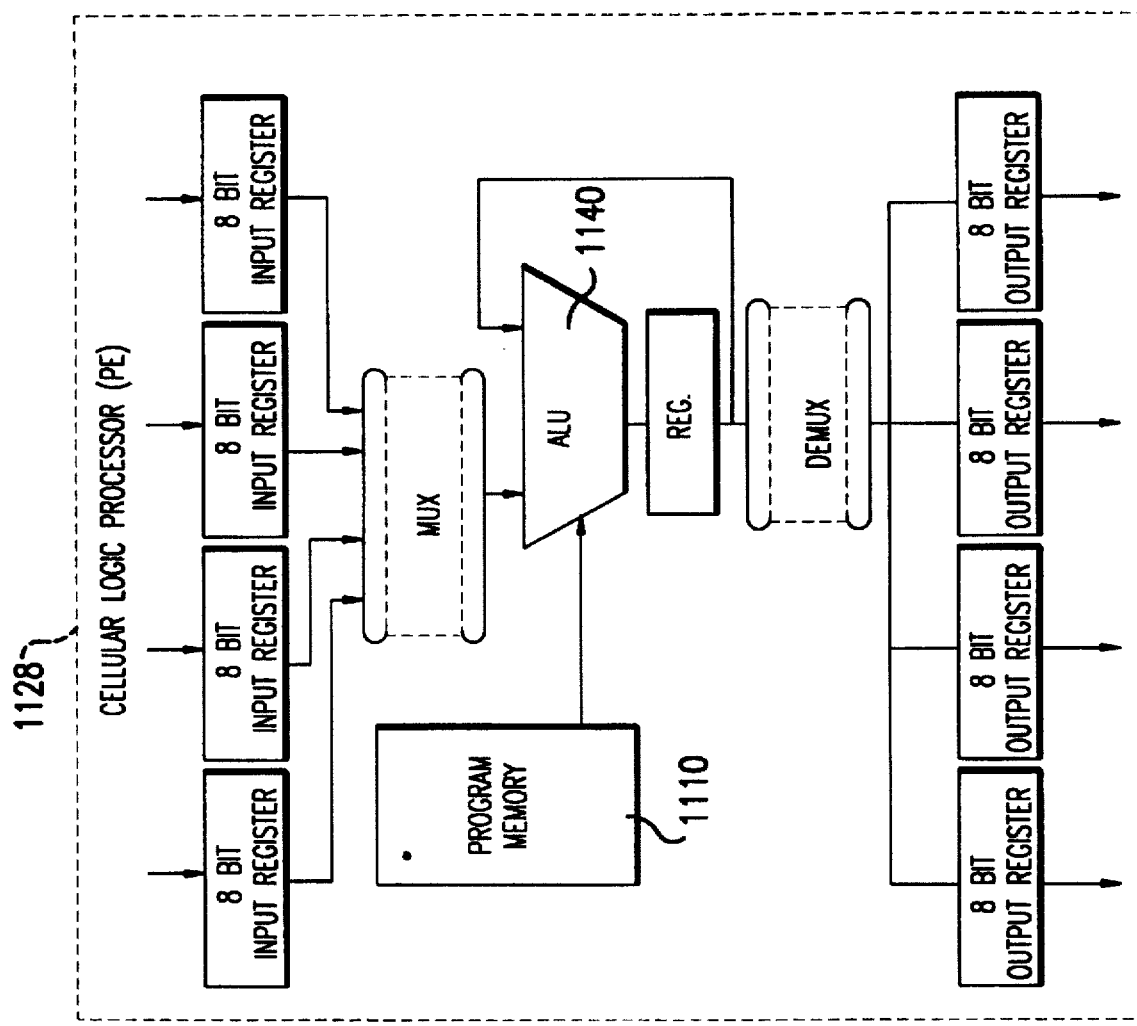
Figure 11C:
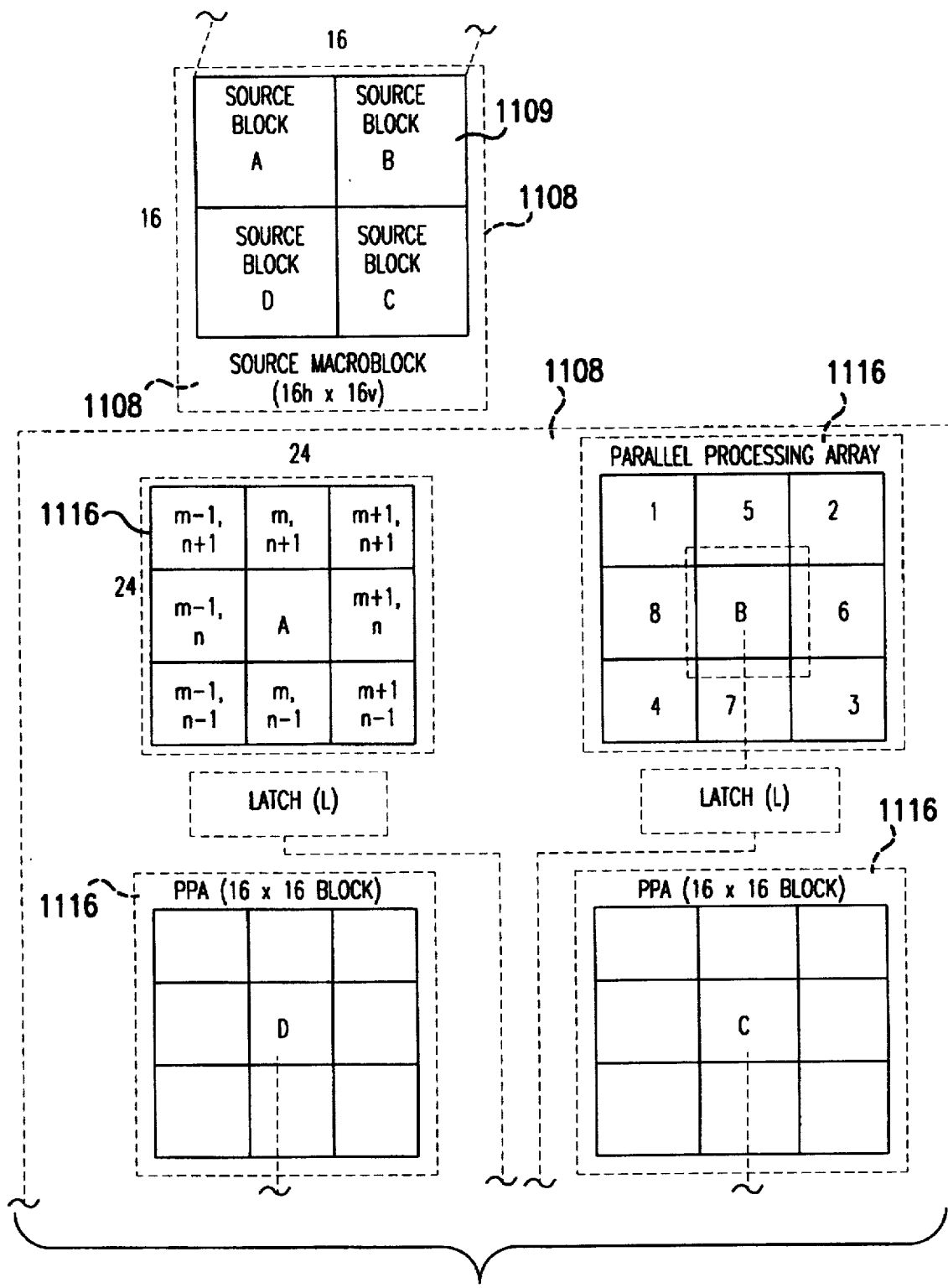
Figure 11D:
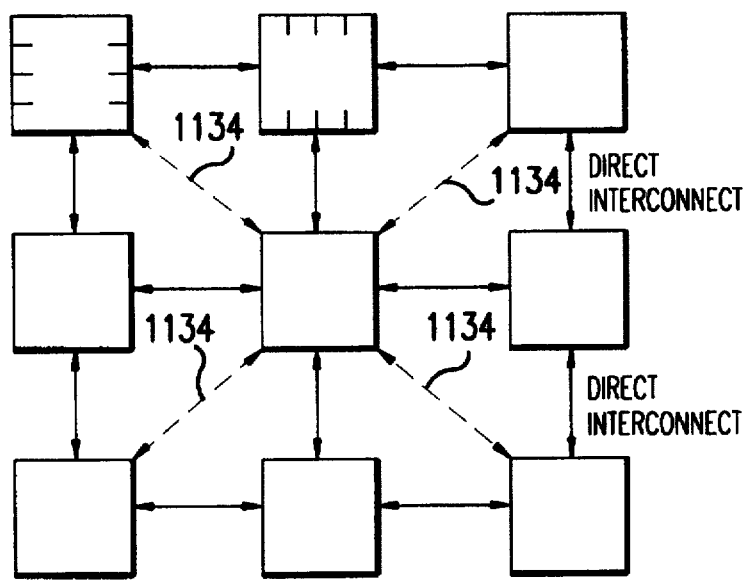
Figure 11D:
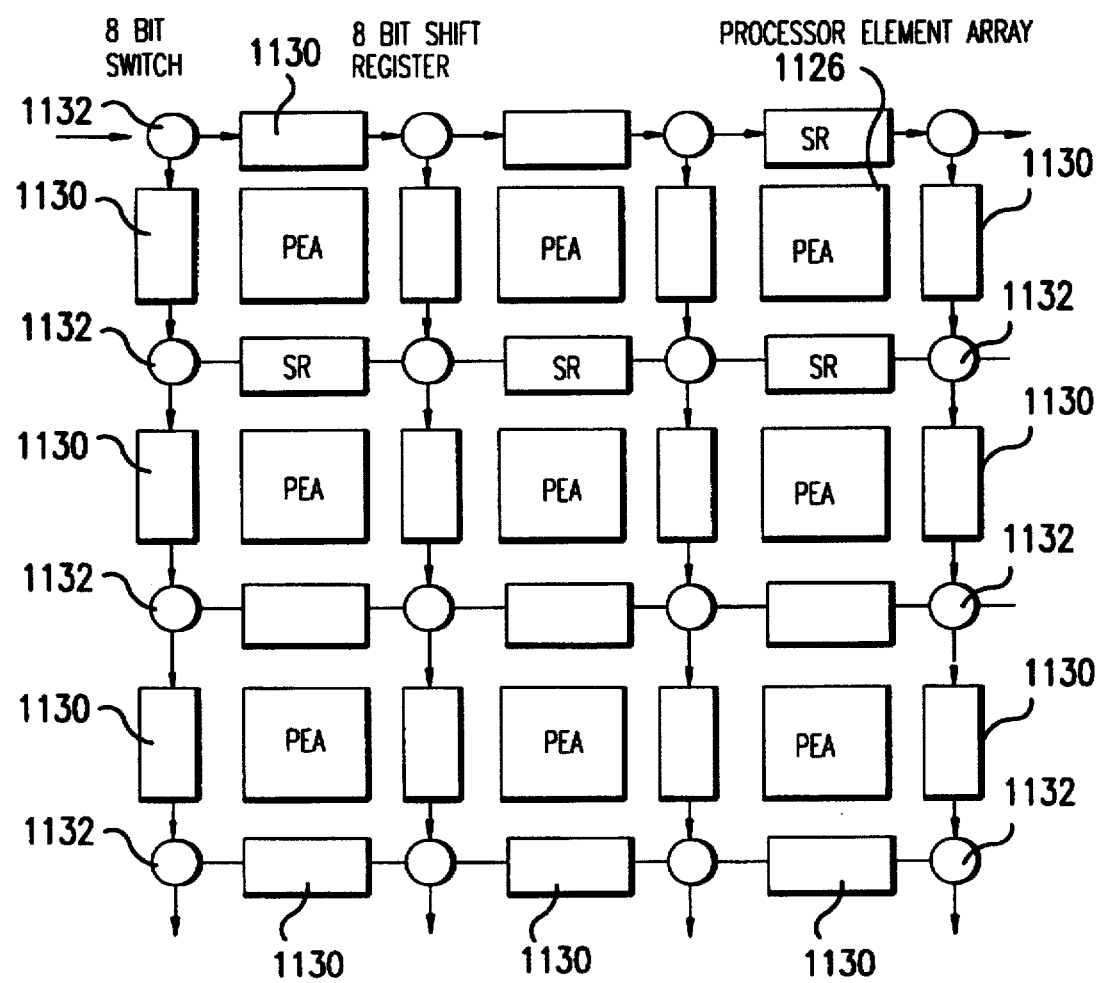
Figure 11E:
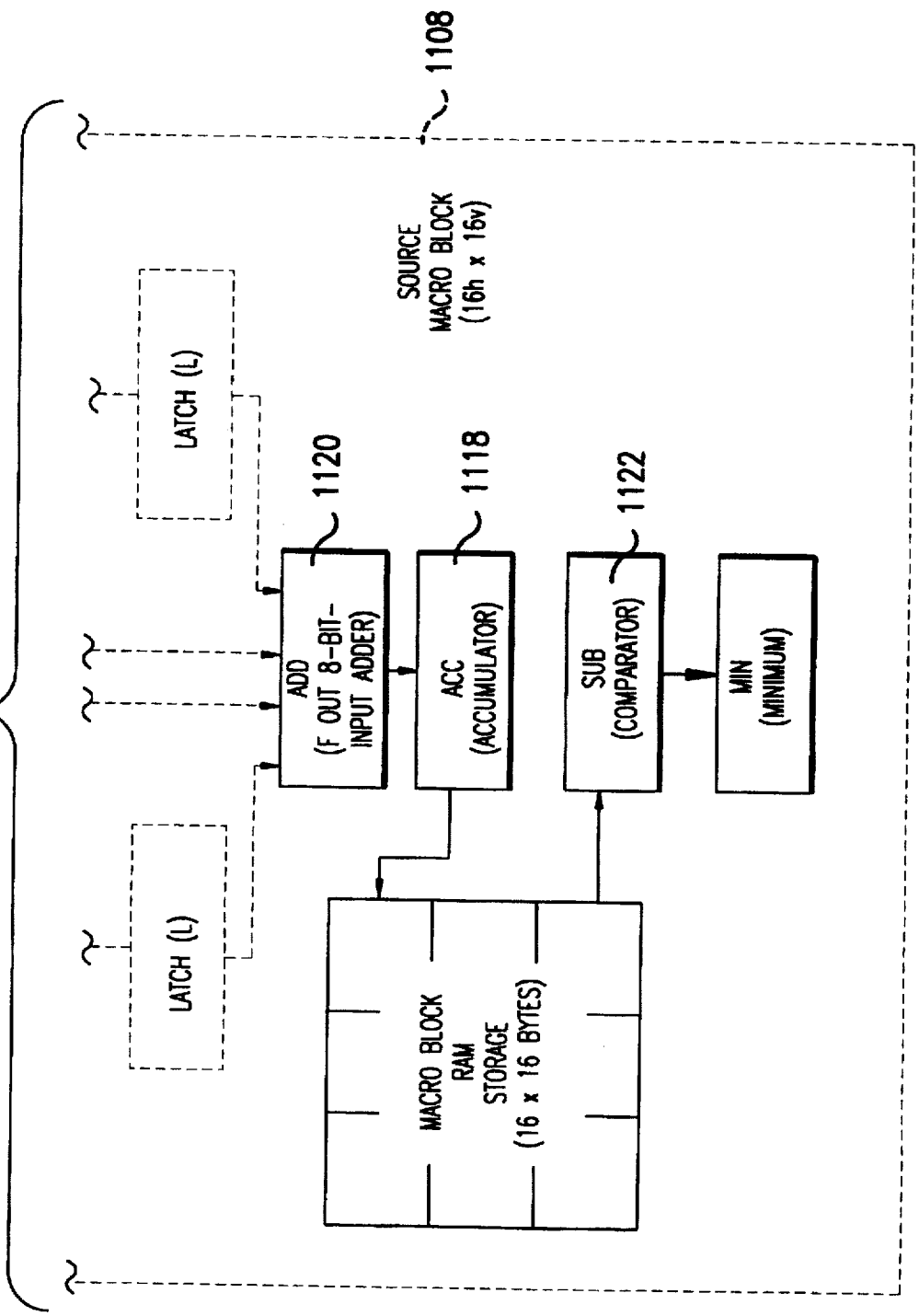
Figure 11F:
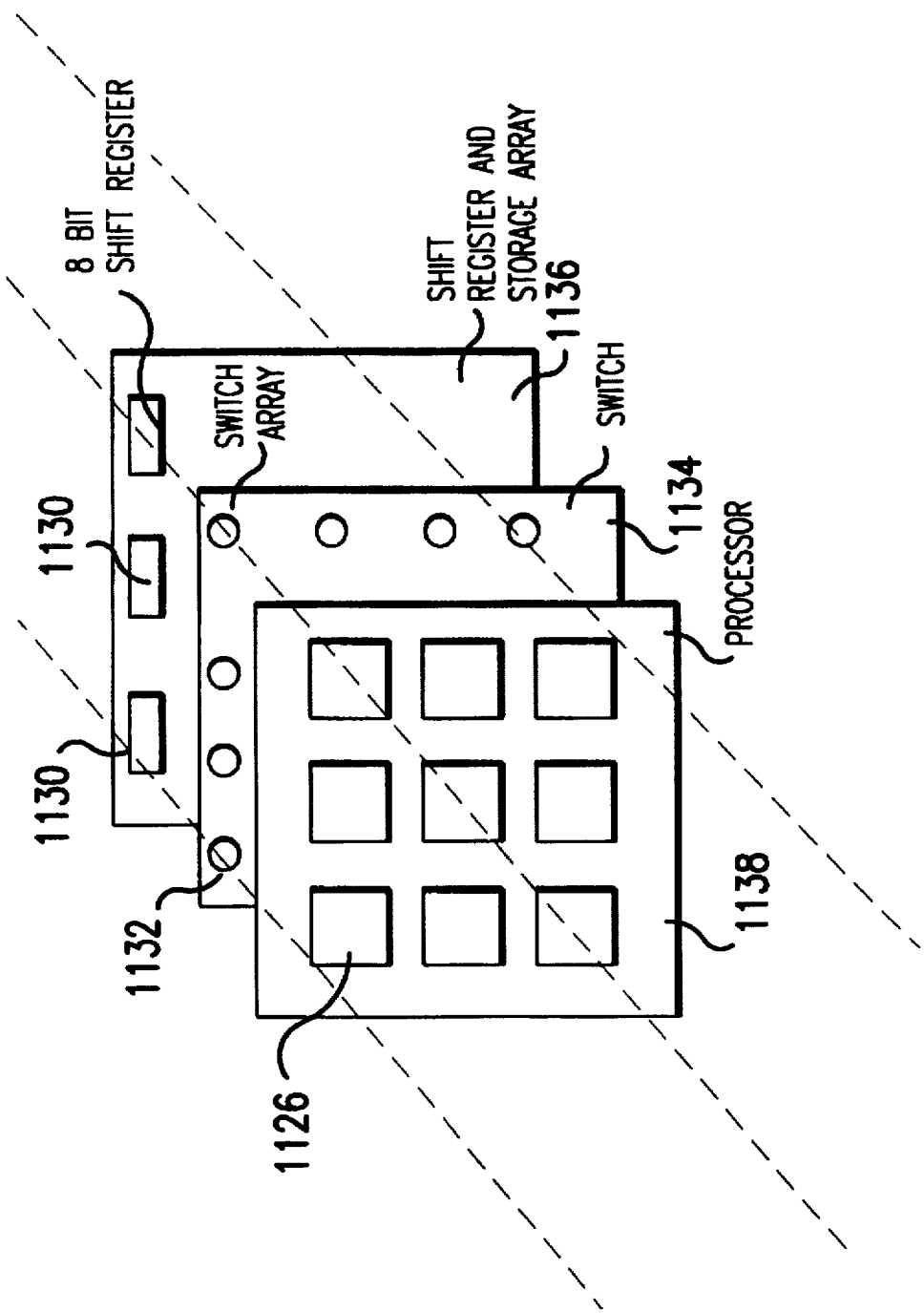

FIG. 10 illustrates the Pixel processor 206 designing to meet the flexible performance for various types of popular video coding algorithms such as the MPEG, H.261 or JPEG. Meanwhile, pixel processor 206 can also perform other pixel domain-based proprietary methods. While most pixel algorithms are either inter 936 or intra 938 frame coding, the CCITT and ISO standard algorithms (MPEG, JPEG and H.261) are transformed domain coding methods employing fast DCT implementation and inter frame differencing techniques. Additionally, MPEG and H.261 also apply motion compensation techniques.

The pixel processor 206 is equipped with a 24 bit address line 1002 to permit it to access 16 mega bytes of program memory. The program memory can further be partitioned into separate segments with each segment designated for a specific coding algorithm. Since pixel processor 306 is micro-programmable, it is relatively easy to update the changes while MPEG 240, H.261 238 and JPEG 244 standards are still evolving.

The pixel processor 206 is also designed with parallel processing in mind. The micro programmable architecture allows multiple pixel processors 206 to couple over video bus 420 to provide concurrent program execution for an extremely high throughput. This will allow each pixel processor 206 to be dedicated to a coder 1008 function or a decoder 1010 function. If 6 pixel processors 206 are employed, this will allow the concurrent execution of an entire macro block 477. Similarly, the multiplicity of pixel processors depending upon cost and size could permit the process of an entire group of block 482 simultaneously.

The choice of host processor 218 is somewhat critical in that it must be able to provide an interface with the external host 1006, it must be able to execute the popular DOS 491 or UNIX program 490 such as word processing or spread sheet programs and it must be economical. A suggested choice is intel 80286 or 80386 microprocessors. These provide a convenient bus interface with the AT bus which has sufficient bus band width to be used as the system bus 418 of the system. The aforesaid micro-processors also provide compatibility with a wide variety of DOS 491 based software application programs. Additionally, the small computer system interface 488 is readily available and capable of providing high speed interface between the internal system bus and the external host 1006.

FIG. 11 is a schematic illustration of motion processor 208 subsystems. Conforming to one of the H.261 coding options, motion processor 208 is designed to identify and specify a motion vector 1102 for each macro block 477 within the existing luminance (Y) frame 474. The motion vector 1102 for the color difference for (U, V) frames 473 can then be derived as either 50% or the truncated integer value of the Y frame. The principle is that for each 16h ×16v source macro block 1108, the surrounding 48h×48v area 1106 of updated new frame 712 will be needed to be searched and compared. The new macro block 477 having the least distortion will be identified as the destination macro block 1104 and the distance between the source and destination macro block will be defined as the motion vector 1102.

The direct implementation of motion processor 208 requires that for each of the four blocks 1109 residing within the old source macro block 1108 of the existing frame, the corresponding destination macro block 1104 centered within the new frame must be identified. Therefore, every corresponding, surrounding 6h×6v area 1106 of blocks in the new frame must be searched and compared with the old macro block reference in order to derive the best match with least distortion. This approach will require 589, 824 cycles of search and compare operations. Provided the search and compare operations can be fully pipelined, an instruction cycle time of 0.13 nano seconds is still required which is too time-consuming for the 75 microsecond per macro block real time requirement at 30 fps updates.

In order to meet such real time performance requirements, the motion processor 208 must employ parallel processing and multi-processing techniques. The multimedia assembly 112 incorporates a fine grain, tightly coupled, parallel pixel processor architecture 1112 which provides faster speed and better results. This is accomplished by partitioning existing macro block 477 into 4 8×8 blocks 1109. Four parallel processing arrays 1116 consisting of 24h×24v processor elements are configured into nine (9) regions. These nine regions of macro processor elements 1114 are tightly coupled together. Each region of the existing frame can have direct interconnection and simultaneous access to its eight (8) nearest neighboring regions from the corresponding new frame. Each region of macro processing elements 1114 is designated to perform various types of pixel domain processing functions for the 8×8 block extracted from the old source macro block 1108.

FIG. 11 illustrates a parallel search method for 8×8 blocks residing within the old source macro block 1108. Each can conduct simultaneous match and compare operations with all of their nine nearest neighboring blocks. The outputs of the nine matching operations are first locally stored at the corresponding regional pixel processor arrays 1116. They are then shifted out and summed at the output accumulator 1118 and adder circuits 1120. The results are then compared using the comparator circuit 1122 to obtain the best match. The physical distance between the new macro block which results in the best match and the old reference macro block will be applied as the motion vector for the old luminance macro block.

The regional pixel processor array 1116 can be reconfigurable and is designed based upon nine banks of processor element arrays 1126. Each processor element array 882 consists of sixty-four processor elements 1128. The nine banks of processor element arrays 1126 are interconnected through shift registers 1130 and switches 1132. In a three-dimensional implementation, a vertically-cascaded processor array 1138 crossbar switch array 1134 and shift register array 1136 can be implemented. Additional layer such as storage array can be added to provide the additional functionality. This array will be extremely powerful when multi-layered packaging becomes available for the chip level modules and intergrated circuit technologies.

A two-dimensional pixel processor array 1116 can also be designed using nine banks of processor element arrays 1126 equipped with peripheral switches 1132 and shift registers 1130. The switches 1132 can be reconfigurable to guide direction about the date of flow where the shift registers 1130 can transfer data from any processor element array 1126 or input to any other processor element array 1126 or output. Both switches 1132 and shift registers 1130 are byte wide to facilitate parallel data flow. The processor element arrays 1126 were designed based upon an 8×8 array of simple processor elements 1128.

The processor element arrays 1126 are designed for interconnection among the processor elements so that reconfiguration can be accomplished to meet different application needs. The processor elements 1128 are designed so that each can be programmed to execute simple instructions. Each processor element 1128 consists of a simple ALU 1140 which can execute simple instructions such as add, subtract, load, store, compare, etc.

Figure 12A:
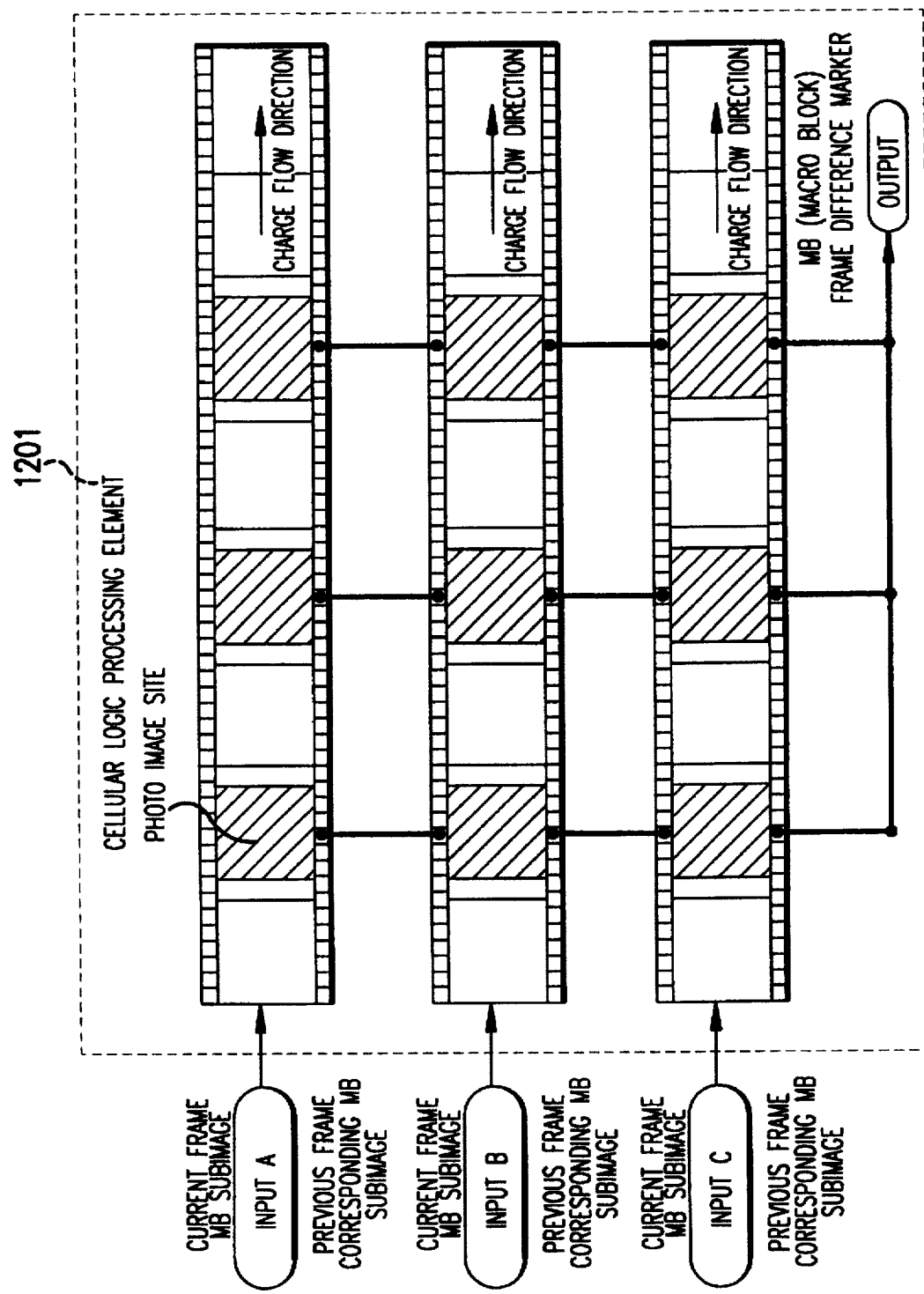
FIG. 12A illustrates a programmable logic device employing cellular array logic architecture.

FIG. 12A illustrates the design example of a programmable logic device 1201 which employs a cellular array logic architecture. This figure is used to demonstrate the functionality and physical design of the device. The practical size for an N×N array is dependent upon the application requirements and the state of the art of the implementing technology.

Figure 12B:
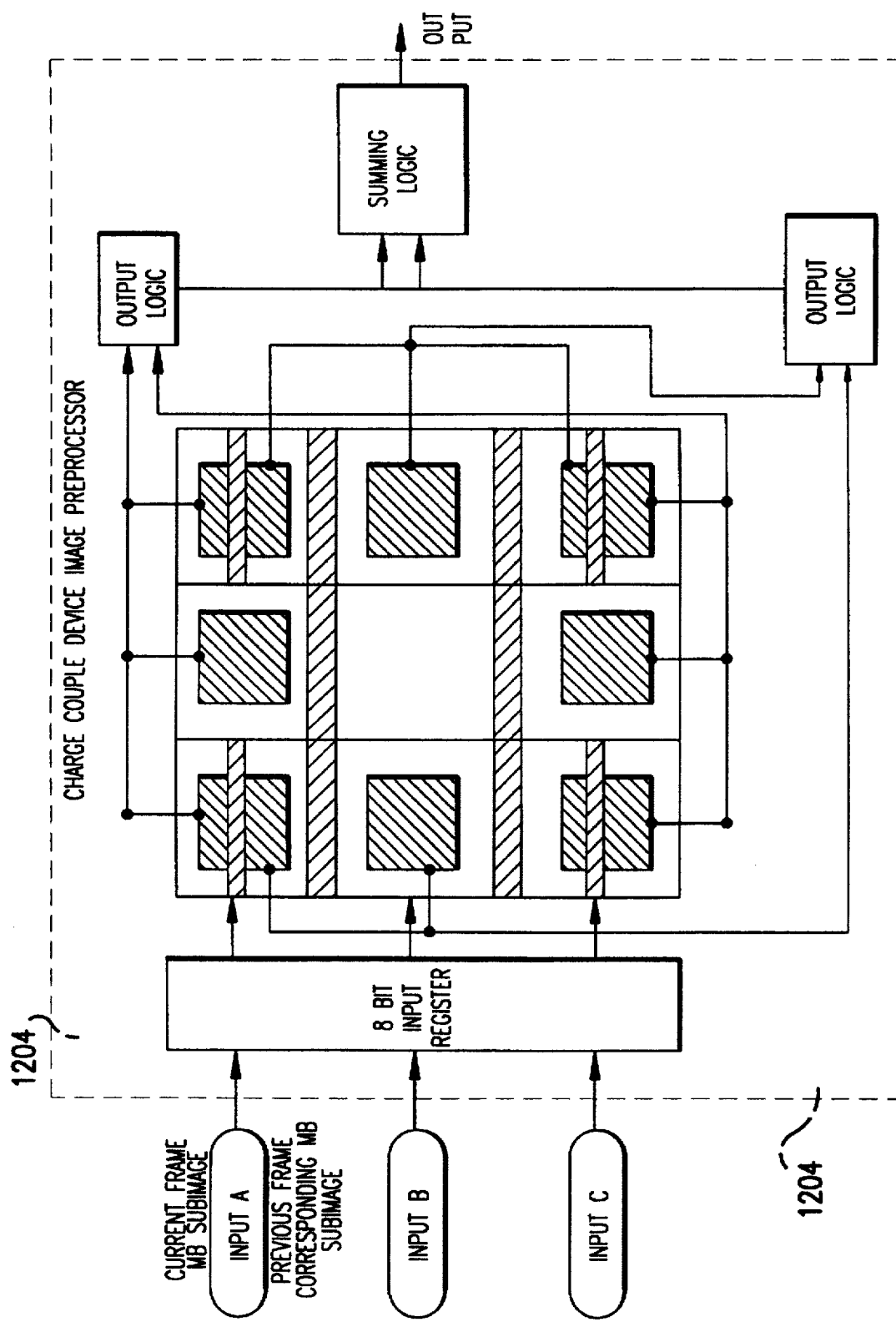
FIG. 12B illustrates the implementation of cellular logic processing.
Figure 12C:
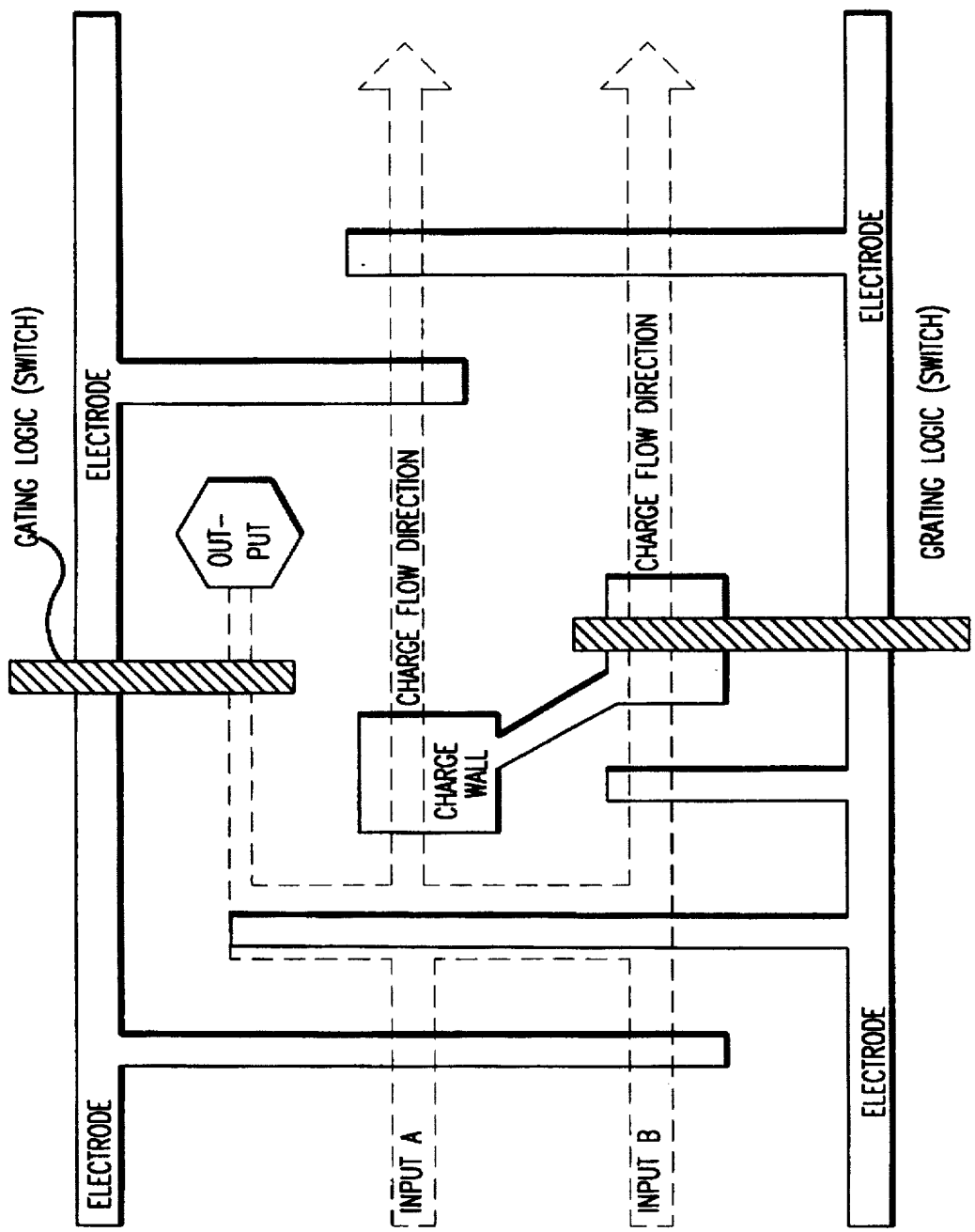
FIG. 12C illustrates gating logic.

FIG. 12B illustrates the practical implementation of a cellular logic processor element 1204 using a charge couple device 970 technology. The objective is to provide an intergrated image sensor array 1206 with the digital preprocessing capabilities so that image coding for the macro blocks and pixel domain image coding functions can be performed. The other objective is to allow the implementation of on-chip parallel image sensing and parallel image processing 976 utilizing the same or compatible technology. The Cellular array logic architecture illustrated in FIG. 12B are useful that they can implement fine grain, tightly-coupled parallel processing systems. They employ single-instruction-multiple-data 1209 or multiple-instruction-multiple-data 1210 techniques to provide system throughput where traditional sequential computing fails.

Many cellular array processors have been designed in the past. Most of them employ a processor array which consists of a matrix of processor elements 1128 and switch arrays 1134 which can provide programmable interconnect networks among the processor elements. These cellular array processors are extremely expensive.

The design illustrated in FIG. 12B is based upon a much simpler architecture, the design being dedicated only to image processing and coding applications. The major objective is to meet real time performance requirements for macro block pixel domain processing functions or motion processing.

FIG. 12A is employed to demonstrate how frame differencing functions can be performed for each of the incoming sub-image macro blocks 477. For illustration, 3×3 array is used to represent macro block sub-image 477 which, from the current frame, is first shifted into the processor element; the corresponding macro block sub-image of the previous frame 1218 is then loaded into the processor element and the comparison functions are performed between the two macro blocks to detect if there is any frame difference. Provided the difference is larger than the preset threshold value, the macro blocks will be marked and the macro block marker 1242 and macro block difference 1244 between the two frames will be stored in frame memory 214. If there is no difference, the current frame macro block value 1216 will be deleted and the previous frame macro block value 1218 will be used for display updates.

If an excessive number of macro blocks 477 are identified with frame difference, then a scene or illumination change has occurred and macro block processor 1220 will notify host processor and pixel processor 206 and switch the operation from interframe coding 1227 to intraframe coding 1228. The significance is that while incoming images sensed from the camera, the specific macro blocks with the frame differencing can be identified and stored. Consequently, in the interframe coding modes 1227, only those macro blocks 477 requiring motion estimation and compensation 1222, transform coding 1229 or quantization 1226 will be marked and stored in the frame memory 214 to represent the image sequence of the current frame. In the case of scene or illumination changes, enough macro blocks will be detected with frame differencing that the system will automatically switch to intraframe coding mode 1228.

FIG. 12B illustrates additional pixel domain processing functions including low pass filtering 1230; high pass filtering 1232 and quantization 1226. The variable quantization 1226 can be performed by presetting the threshold value 1234 and then shifting and quantizing the corresponding transform domain coefficients based upon the zig-zag scan format at each low, medium and high frequency regions. The threshold value can be reprogrammed to adjust the quantization level. The advantage is that as soon as the input image is detected, sampled and thresholded, several pixel domain preprocessing functions, such as frame differencing and motion estimation, can be performed right away. The differencing macro blocks will be sent to transform processor 210 to perform DCT operation 1224, the output of the DCT coefficients can further be reloaded into the processor element array to perform quantization. When band width reduction control 260 is required, initial thresholding is combined with a coarser quantization 1226 level to reduce the image resolution. When the system demands faster performance, multiple parallel processor element arrays can be cascaded to perform concurrent macro block operations such as frame differencing, motion processing and quantization.

The advantage of charge couple device technology 1202 is its suitability for image processing, multiplexing, and storage operations. This can be done both in the analog and digital domain. Therefore, depending upon the application requirement, both analog processing 1238, digital processing 1240 and memory functions using these processor element arrays 1126 can be accomplished.

Figure 13:
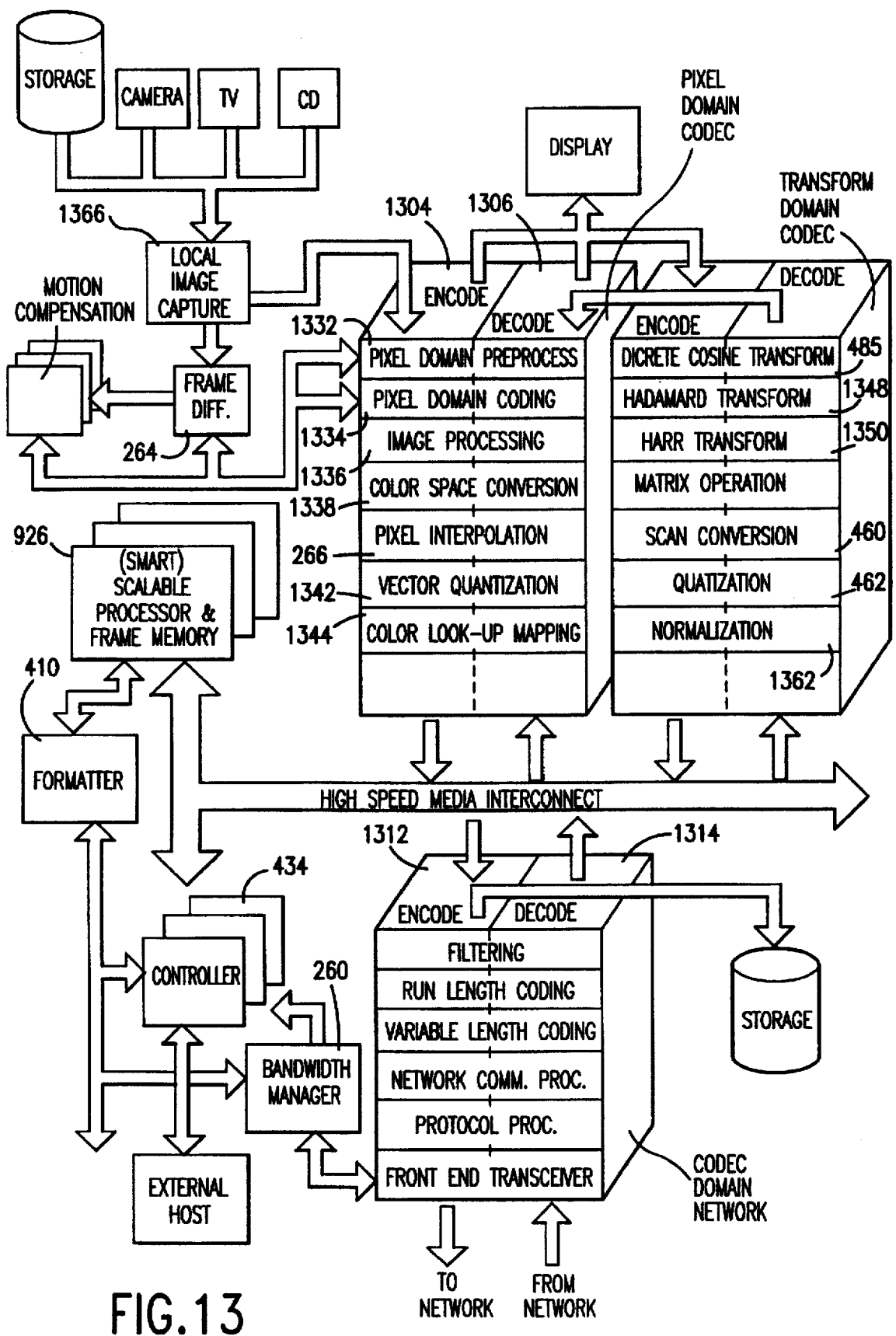
FIG. 13 is a schematic of the multimedia assembly.

FIG. 13 is a schematic illustration of the functional model architecture in order to simplify the functional processes covered out by the hardware previously discussed. The principal functional elements comprise a band width manager 1300, a formatter 1302, a pixel-domain-codec encoder 1304 coupled with a pixel-domain-codec decoder 1306, a transform-domain-codec encoder 1308 coupled with a transform-domain-codec decoder 1310, a network-domain-codec encoder 1312 coupled with a network-domain-codec decoder 1314 and a controller 1316.

The band width manager 1300 provides band width control capability wherein a two-dimensional band width-over-lay-lookup-table (BOLUT) can be constructed to map the specific band width ranges, i.e., 2.4 Kbs to 100 Mbs, et al, into selective options of media combinations such as overlay in the audio, video, text and graphics with various types of quality and resolution.

Additionally, during noisy communication environments, the band width manager 1300 function is to constantly monitor the network to detect abrupt network band width changes caused by local line degradation or network traffic congestion. The band width manager 1300 will respond by adjusting the media combinations to accommodate the available band width.

During stable communication environment, band width manager 1300 operates to reconfigure the different band widths specified by the network providing upgradability and parallelism for time-sharing.

The formatter 1302 communicates with the band width manager 1300 to ascertain the band width availability for incoming or outgoing signals. The formatter translates this external information into an internally-operating format. The scalable memory array reconfigurable technique will reconfigure the internal processer and frame memory structure pursuant to the directions of the formatter. This allows the external format to be translated into a suitable internal format to provide system compatibility. The scalable-memory-array-reconfigurable-technique (SMART) as discussed in FIG. 9 is capable of translating a programmable internal format in compliance with a wide variety of international standard and custom video coding algorithms such as MPEG, H.261, JPEG and vector quantization. Formatter 1302 identifies the transmitting or receiving coding algorithms, derives their specific format requirements and if these external format requirements are different from the current internal formats, the formatter reformats the horizontal and vertical resolution which results in a separate internal format which is compatible with the external format. These internal format operations, such as the reduction of the horizontal and vertical resolution, are performed by employing interpolation and downsampling techniques or upsampling techniques. The formatter 1302 also communicates with the frame memory so that the frame memory is aware of the internal format to be stored. This allows the formatter 1302 in conjunction with the scalable memory array configurable technique to formulate a scalable processor and frame memory architecture so that the internal processor and frame memory can be continually adjusted in order to reconfigure or modify a suitable internal format for any type of external format either being received or sent by the network-domain-codec 1314.

The network-domain-codec encoder 1312 and decoder 1314 are used to provide line coding and decoding functions. Network domain codec decoder 1314 would receive network transmissions via its front end transceiver 1320. It would then perform protocol procedures 1322, network communication procedures 1324, variable length coding 1326, run length coding 1328 and filtering 1330. The resultant transform coefficients and pixel data will then be forwarded to either pixel-domain-codec decoder 1306 or transform-domain-codec decoder 1310. The network-domain-codec encoder 1312 would receive encoded pixel data or transform coefficients from the other encoders and convert them into serial codes for network transmission performing functions similar to the network domain codec decoder 1314. Simultaneously, band width manager 1300 will interface with encoder 1312 and decoder 1314 to exchange protocol control and applications information regarding band width availability.

The pixel-domain-codec encoder 1304 and decoder 1306 are designed for custom coding algorithms such as vector quantization, pixel domain operations for the DCT transform based standard coding algorithms such as MPEG, et al, pixel domain operations for motion compensation and image post-processing functions and analysis and preprocessing techniques for video coding. Thus, the pixel-domain-codec provides for pixel domain preprocessing 1332, pixel domain coding 1334, image processing 1336, color space conversion 1338, pixel interpolation 1340, vector quantization 1342 and color lookup mapping 1344.

The transform-domain-codec encoder 1308 and decoder 1310 are specifically designed for forward and inverse transformation operations required by the international standard coding algorithms such as MPEG, et al. Transform-domain-codec encoder and decoder 1308 and 1310 also provide forward and inverse transform-based operations such as Hart transform and Hadamard transform. Additionally, generic matrix operations and post-matrix operations, such as scan conversion, quantization and normalization techniques, are performed by the transform-domain-codec.

The controller 1316 comprised of either a single or plurality of local host processors which manage the instruction sequencing and system control functions for data transfer, memory management, input/output interfacing and processor pipelining.

In FIG. 4, we demonstrated a host processor used to manage the communications pipeline, the network domain codec and the system memory. It also performed general administrative tasks and controlled the system bus and access to other subsystem buses while communicating with the band width manager 1300.

A second controller is a single or plurality of pixel processors used to manage the video pipeline, the scalable memory array reconfigurable technique, frame memories, formatters and display processing. Additionally, the pixel processor is used to perform pixel-domain-codec encoding and decoding functions and can be used in multiples in order to facilitate macro block and group of block processing. Similarly, a single or plurality of transform processors can be employed as coprocessor for the pixel processors, in performing transform-domain-codec encoding and decoding functions.

All network transmissions or receiving functions would first pass through the network-domain-codec and then be directed to the pixel-domain-codec or transform-domain-codec after suitable formatting. The media information could then be displayed via the pixel-domain-codec decoder 1306. Origination signals from either storage, camera, TV or CD would be subjected to frame differencing 1364 and frame image capture 1366 before being encoded by pixel-domain-codec encoder 1304. These origination signals could then be transmitted via network-domain-codec, encoder 1312 dependent upon the band width manager 1300 and controller 1360 monitoring of band width availability.

While the invention has been described with reference to its preferred embodiment thereof, it will be appreciated by those of ordinary skill in the art that various changes can be made in the process and apparatus without departing from the basic spirit and scope of the invention.

I claim:

1. A controller apparatus for executing a plurality of control functions for communication of multimedia articles including voice, high quality audio, text, still image, motion video and animated graphics between multimedia equipment and communications networks, selectively providing receiving functions, retrieving functions, and transmitting functions, wherein said controller is compatible with multiple band widths and algorithmic coded signals, said controller providing a scalable architecture for communication of multimedia data, formatting from internal format to external format in compliance with any selective one of a plurality of international standardized and customized coded algorithms, and band width determination of available display band widths according to frame rate and available transmission band widths, said controller comprising:

means for receipt of an external network signal, said means comprising a network domain decoder;

means for receipt of a local origination signal; and means for image processing of said origination signal for storage coding simulation, and transmission;

a first control means and format means for selectively formatting the format of said external network signal and local origination signal to a compatible first internal format in compliance with internal processing and memory capabilities;

means for decoding said external network signal according to said first internal format, said means selectively comprising a transform domain decoder alone and in combination with a pixel domain decoder;

a second control means and format means for selectively formatting said external network signal and said origination signal to a second internal format in compliance with a selective plurality of coding algorithms for processing, storage and transmission, said means further comprising an encoding means which comprises a pixel domain encoder alone and in combination with a transform domain encoder for encoding said external network signal and said local origination signal;

means for reconfiguring the memory means for selectively associating with said apparatus encoders and decoders for directing said first and second format means;

band width management means, in communication with said second format means and said control means, for directing available run time transmission band widths and appropriate compression ratios for selectively formatting said second internal format to external transmission format in compliance with available transmission band width range, said band width management means continuously moderating and correcting said selective formatting of said second internal format to said second external transmission format based on transmission band width availability;

means for transmission of said internally formatted external network signal and local origination signal according to said external transmission format, said means comprising a network domain encoder.

2. A controller apparatus in accordance with claim 1 wherein said network domain decoder for receipt of said external network signal selectively comprises a front and transceiver; protocol processor; network communications processor; variable length decoding processor; run length decoding processor; and filtering processor for sampling said external network signal, said network domain decoder in communication with said first control means and said format means to convert the horizontal and vertical resolution of said external network signal to an internally-defined file format size for reducing said internal real time video processing and frame memory updating requirements.

3. A controller apparatus in accordance with claim 1 wherein said second controlling means and said second formatting means, in communication with said network domain encoder and decoder selectively codes and decodes said incoming signal based upon the availability of customized and international standardized algorithms and selectively performs motion compensation processes and motion simulation processes to improve quality of said motion video article, said processes include pattern match, edge detection, image enhancement, color mapping and pixel interpolation of said external network and local origination signal.

4. A controller apparatus in accordance with claim 1 wherein external network signal is selectively transferred to said transform domain decoder and said pixel domain decoder for decoding; said transform domain decoder selectively providing denormalization, dequantization, scan conversion, matrix operation, inverse Haar transform, inverse Hadamard transform and inverse discrete cosine transforms on said external network signal and said pixel domain decoder selectively performing color mapping, vector dequantization, pixel extrapolation, color space conversion, image processing, pixel domain decoding, and pixel domain preprocessing on said external network signal for formatting of said external network signal and conversion to said first internal format for either storage processing, display or transmission.

5. A controller apparatus in accordance with claim 1 wherein said means for image preprocessing of said local origination signal comprises an integrated circuit subsystem further comprising:

means for performing integrated parallel sensing and storage wherein a plurality of input frames for said local origination signal can be sensitized, digitized and stored; and means for performing detection of instantaneous scene changes wherein only the corresponding frame will be registered as intraframe, wherein all other frames will be registered as interframes, said detection means further comprising means for moderating the threshold level for proper determination of said scene changes; and means for performing in analog and digital forms parallel image preprocessing for said interframes whereby each interframe image can be retrieved and compared to develop a plurality of corresponding frame differencing articles whereby only said frame differencing articles are required for further processing and encoding including motion estimation, discrete cosine transform, quantization, and huffman-like variable length coding.

6. A controller apparatus in accordance with claim 5 wherein said means for image preprocessing for each said interframe further comprise a means for motion estimation, motion simulation and motion compensation operations on motion video articles comprising:

means to perform edge detection operations for each of said frame differencing articles wherein a selective plurality of detected edge articles are derived to identify said motion video articles during motion estimation and compensation operations;

means to perform feature extraction operations for each of said frame differencing articles wherein said extracted specific features for said frame differencing articles can identify from said motion video articles during said motion estimation process; and means to perform forward, backward and random reference of selective interframes employing said selective features and said selective detected edges for said frame differencing articles.

7. A controller apparatus as set forth in claim 5 wherein said motion video articles include a plurality of moving foreground pixels overlaying can be referenced using transmission of a single or plurality of preceding intraframes wherein said small moving foreground pixels for subsequent plurality of interframes can be referenced using frame differencing techniques wherein each group of said moving foreground pixels are characterized employing said frame differencing of a plurality of said detected edges and a plurality of said extracted features.

8. A controller apparatus in accordance with claim 7 wherein a motion video article can be applied with one or more pattern searching and recognition algorithms to derive alternative reference motion vectors wherein said motion vectors can forward, backward and random reference said motion video article during said interframe sequencing said motion vector can be represented by the interframe displacement of symbolic representation further comprising a plurality of detected edges, frame differences and extracted features for each corresponding motion video article, said symbolic representation and alternate motion vector can be applied for transmission simulation, coding, storage and processing of said motion video articles.

9. A controller apparatus in accordance with claim 5, wherein said means for interframe image preprocessing further comprises parallel processor means for performing pixel level operations for an n×n pixel block sub-image, said means comprising an m×m array of said parallel processor elements wherein n and m are integers and said parallel processor means can retrieve, decode and execute instructions for pixel input data from internal memory; and interconnection means for selective communication between each of said parallel processors whereby said pixel data inputs and incoming control messages can be received from said selected parallel processors and said pixel data outputs and outgoing messages can be broadcast to said selected parallel processing neighbors.

10. A controller apparatus in accordance with claim 5 wherein said means for interframe image preprocessing further comprises a processor array configured as an n×n cellular logic array processor where n is typically of value in a range of between 8 and 32 wherein said cellular logic array processor can be employed to perform a plurality of block processing operations for said n×n pixel block of sub-image, said processor array further comprising:

- a means for frame differencing between interframes wherein a group of n×n difference blocks are identified, registered and stored;
- a means for template matching and article recognition operations for each of said n×n pixel blocks of said sub-image article extracting from said input image and comparing with selective n×n reference data stored previously in memory;
- a means for determination of threshold level for selective matching said sections of said sub-image article to identify a motion vector article;
- a means for motion estimation operation which can be applied to each of said n×n sub-image blocks for comparison between said previously-displayed frame article and said current frame article, said n×n sub-image performing matching functions at said frame differencing locations for generating horizontal and vertical distance for representing said motion vector;
- a means for edge detection for each of said n×n blocks of said sub-image and means for edge enhancement for each of said decompressed image blocks prior to display, said edge detection for deriving said motion vector;
- a means for feature extraction and comparison of said previously-displayed frame with said current frame;
- Hadamard transform means for each of said n×n blocks of said sub-image wherein each of said n×n blocks is represented by its pixel domain transform coefficient multiplied by the n×n Hadamard coefficient matrix thereby reducing transmission band width through pixel domain band width compression; and
- frequency domain transform means including discrete cosine transform means wherein each of an 8×8 frame differencing sub-image block can be multiplied by an 8×8 transform coefficient block to derive 8×8 blocks of frame differences identified by said frequency domain transform coefficients.

11. A controller apparatus in accordance with claim 1 wherein said second control means and second format means for selectively formatting said internal format further comprises a means for template matching pattern recognition and motion estimation and compensation, comprising:

means for extracting each of the n×n luminance pixel blocks from said previous reference interframe; and means for performing template matching operation of said n×n reference block within a m×m window of surrounding pixel blocks residing in said current interframe wherein m and n are integers and m is greater than n, said template matching generating a motion vector for said pixel block in the event of a match;

means for determining and adjusting said m×m window size in the event of no match;

means for performing pattern recognition on said adjusted n×n window sub-image.

12. A controller apparatus in accordance with claim 1 wherein said image preprocessing apparatus further comprises a means for identifying an estimating randomly-generated signal noise embedded within the input image article; and means for subtracting said randomly-generated signal noise from said original input image article by means of a first sensor and a second sensor, said first sensor sensitizing image and noise and said second sensor sensitizing noise for comparison of said sensors and subtraction of said noise signal.

13. A controller apparatus in accordance with claim 10 wherein said article means for template matching further comprises:

means for retaining color representation of each significant object of said frame;

means for storing said color representation;

means for retrieving said color representation and performing pel domain transform operations;

means for converting said color representation from said pel domain to said frequency domain in order to perform additional frequency domain processing means such as discrete cosine transform and fast fourier transform.

14. A controller apparatus in accordance with claim 1 wherein said band width management means comprises a means for generating a network transmission request signal for the transmission band width requirement for outbound transmission multimedia articles;

means for receiving an acknowledgement signal from an extension network controller with respect to transmission band width requirement;

means for comparing said acknowledgement signal with said outbound transmission signal to determine sufficiency of transmission band width;

means for adjusting said outbound transmission signal to accommodate said band width availability;

means for compressing and decompressing said outbound transmission signal;

means for transmitting said outbound transmission signal;

means for continuous monitoring said outbound transmission and said band width availability and selectively adjusting said outbound transmission signal to conform to said availability of said band width during said transmission.

15. A controller apparatus in accordance with claim 1 wherein said means for selectively reconfiguring memory comprises:

means for definition of a default internal file format and size based upon coder processing and frame memory system throughput;

means for receipt of an external algorithmic coded signal during network inbound stage, said means comprising a network domain decoder;

means for receipt of a local origination signal, said means comprising a capture processor;

means for identifying and receiving article types and file size during said network inbound stage, said means comprising a host processor and its interface to said capture processor or said network decoder;

means for providing adequate downsampling ratio, wherein said receiving article can be conformed and reduced to said predefined internal file format and size; said means comprising a reconfiguration unit and a scaler circuit;

means for manipulation of said internal file articles, said means comprising an article-oriented instruction set, and means for storing retrieving, decoding, and executing said instruction set by said host processor and said pixel processor;

means for readjustment of said internal file format and size in conformance with band width availability, said means comprising a band width management unit in communication with said scaler circuit, reconfiguration unit and said host processor;

means for adjustment of said internal file format and size during interframe coding modes, wherein a plurality of motion video foreground articles can be specified to proper size, and wherein static background articles can be pretransmitted during intraframe coding modes, said means comprising a frame differencing circuit and motion processor interfaced with said pixel processor; and means for providing upsampling ratio during transmission, wherein said transmitting article can be conformed and expanded to a selectively-desired file format and size, said means comprising said reconfiguration unit, and said scaler circuit interfaced with said band width management unit.

16. A controller apparatus in accordance with claim 1 wherein said first control means and second control means communicate across the network with external devices including pagers, remote control means and host computers for the selective exchange of command, data, status and control information with said external devices wherein said external devices perform selective multimedia applications for said controller, said communication means between said controlling means and said external devices comprising:

means for providing command layer protocol control functions in the form of predefined commands selectively interpreted by said control means;

means for updating and rearranging said predefined commands;

means for prioritizing said predefined commands;

means for providing transport layer protocol control functions;

means for data transfer and data tracking in cooperation with said command layer protocol; and means for providing physical layer protocol control functions for implementation of initialization termination of mechanisms.

17. An apparatus for the adaptive continuous management and control of network traffic condition and band width availability for the communication of multimedia articles including voice, audio, text, still image, motion video and animated graphics between multimedia transmitter and receivers wherein said apparatus is compatible with multiple analog and digital transmission standards, such as analog voice grade line, PSDN, basic rate ISDN, primary rate ISDN/T1, LAN, and FDDI, the apparatus having a band width detection means determining available display band widths in accordance with frame rate and run time transmission band width, said apparatus comprising:

a means for generating a transmission request signal provided with message retaining transmission band width for an outbound multimedia article;

a means for receiving a transmit acknowledge signal from a network controller and destination receiver indicating said band width availability;

a means for relaying a band width availability signal to a band width management unit for comparison of band width availability to transmission signal;

a means for generating an alternate compression ratio for said transmission signal compatible with said band width availability;

a means for implementing said alternate compression ratio through a host or encoding processor for further compression of said multimedia article to meet said band width availability;

a means for transmitting said multimedia article on said available band width; and a means for monitoring said multimedia article transmission in said band width availability during transmission.

18. An apparatus for the continuous management and control of transmission band width availability in accordance with claim 17 wherein said means for generating said transmission request signal and said means for generating an alternative compression ratio further comprise:

a means for sensitizing outbound line condition changes whereby outbound transmission bit rate is adjusted to provide sufficient composition of said multimedia article groups, said means for sensitizing said outbound line condition comprising a selection of a plurality of quality levels for digitally-compressed audio articles; a selection of a plurality of quality levels for digitally-compressed motion video articles; a selection of a plurality of quality levels for digitally-compressed still images; a selection of a plurality of frame updating rates for digitally-compressed motion video articles; a selection of plurality of quality levels for digitally-coded animated bit mapped or vector graphics articles; and a selection of a plurality of options for composites of said digital, audio, image, video and animated graphics articles; and a means for selectively monitoring and adjusting said rate requirements for said outbound multimedia articles.

19. An apparatus in accordance with claim 17 for the continuous management and control of said band width availability, said apparatus further comprising:

a plurality of predefined program sequences for a plurality of transmission line conditions whereby each of said program sequences comprises a specific group of multimedia articles, predefined for said transmission band width availability; and a means to store said predefined program sequence and reference said predefined program sequence during line condition changes.

20. A method for the adaptive continuous management and control of network traffic condition and band width availability having a band width detection means determining available display band widths in accordance with frame rate and run time transmission band width, for the communication of multimedia articles including voice, audio, text, still image, motion video and animated graphics between multimedia transmitter and receivers whereby said apparatus is compatible with multiple analog and digital transmission standards such as analog voice grade line, PSDN, basic rate ISDN, primary rate ISDN/T1, LAN, and FDDI, the method comprising:

(a) generating a transmission request signal provided with message band width requirement for outbound multimedia articles;

(b) receiving a transmit acknowledge signal from an external network controller and destination receiver indicating said band width availability;

(c) relaying said band width availability to a band width management unit for comparison with band width of said outbound multimedia articles;

(d) generating an alternative compression ratio for said outbound multimedia articles compatible with said available band width;

(e) relaying said alternative compression ratio to a host or encoding processor for further compression of said outbound multimedia articles in conformance with said band width availability;

(f) transmitting said outbound multimedia articles in conformance with said transmission band width availability;

(g) monitoring said band width availability and said transmission of said outbound multimedia articles during said transmission;

(h) generating alternative compression ratios during transmission to adapt to changes in said band width availability;

(i) repeating steps (a) through (h) as required.

21. A scalable, reconfigurable memory apparatus for executing a plurality of preprocessing and post-processing functions for the communication and storage of multimedia articles including voice, audio, text, still image, motion video, and animated graphics between selective multimedia transmitters and receivers, said memory apparatus compatible with multiple standard or customized coding algorithmic signals including H.261, MPEG, JPEG, EDTV or HDTV, said apparatus comprising:

means for definition of a default internal file format and size based upon coder processing and frame memory system throughput;

means for receipt of an external network algorithmic coded signal, said means comprising a network domain decoder;

means for receipt of a locally-originated signal, said means comprising a capture processor;

means for identifying and receiving said multimedia article and file size, said means comprising a host processor selectively interfaced with said capture processor and network domain decoder;

means for downsampling wherein said multimedia article can be conformed and reduced to a predetermined internal file format and size, said means comprising a reconfiguration unit and scaler circuit;

means for manipulation of said internal file format, said means comprising said host processor and a pixel processor;

means for adjustment of said internal file format and size to conform to band width availability, said means comprising a band width management unit in communication with said scaler circuit, said reconfiguration unit and said host processor;

means for adjustment of said internal file format and size during interframe coding, wherein motion video foreground articles and still background articles are differentiated and separately transmitted, said means comprising a frame differencing circuit, and motion processor in interface with said pixel processor;

means for providing upsampling during transmission wherein said transmission of said multimedia article can be formatted and sized, said means comprising said reconfiguration unit, and said scaler circuit in interface with a band width management unit.

22. A scalable, reconfigurable memory apparatus for executing a plurality off preprocessing and post-processing functions for video coding in Accordance with claim 21, further comprising:

an integrated parallel processor and storage array whereby a plurality of frames of said input image can be sensitized, digitized and stored;

a parallel image preprocessor array for performing real time image encoding operations, said preprocessor array including a frame differencing operation whereby during image encoding operations, said input images can be sensitized and compared to develop frame differencing articles whereby said frame differencing articles can be further processed for motion estimation, discrete cosine transform, quantization, and huffman variable length coding whereby said motion estimation and motion compensation operations comprise an edge detection operation for each of said frame differencing rticles whereby a plurality of detected edge articles are derived to identify said motion video objects during said motion estimation and compensation operations; and a feature extraction operation whereby extracted specific features for each of said frame differencing articles can be identified.

23. A scalable, reconfigurable memory apparatus for executing a plurality of preprocessing and post-processing functions in accordance with claim 22 wherein said input images comprise moving foreground pixels overlaying still image background pixels whereby said background pixels may be characterized singly during interframe coding, requiring single transmission, and said moving foreground pixels are detected utilizing said interframe differencing technique in said motion estimation and compensation technique whereby said parallel processor performs pixel level operations for an n×n pixel block sub-image, said parallel processor comprising an m×m array of parallel processor elements whereby n and m are integers of equal or unequal value.

24. A scalable, reconfigurable memory apparatus for executing a plurality of preprocessing and post-processing functions in accordance with claim 23 wherein said parallel processor elements can retrieve, decode and execute instructions for said pixel input data in its internal buffer or in neighboring parallel processor elements buffer, said pixel output data can be stored internally and in neighboring parallel processors in an interconnection means programming each of said parallel processors to a selective group of neighboring parallel processors whereby pixel data inputs and control messages can be received from said selected parallel processing neighbors and pixel data outputs and outgoing messages can be transmitted to said selected group of parallel processor neighbors.

25. A scalable, reconfigurable memory apparatus for executing a plurality of preprocessing and post-processing functions in accordance with claim 24 wherein said parallel processors can be arrayed and configured as an n×n cellular logic array processor wherein n is a value of between 8 and 32 and said cellular logic array processor can perform processing operations for said n×n pixel blocks of sub-images including said frame differencing operation between a current frame and a previously-displayed frame whereby a group of n×n differencing blocks are identified, registered and stored; template matching operations for each of said n×n pixel blocks of sub-images, said template matching operation extracting an input image and comparing with a previously-stored input image thereby deriving a motion vector; pattern matching; motion estimation applied to each of said n×n sub-image blocks residing within said previously-displayed frame; edge detection for each of said n×n blocks; feature extraction; Hadamard transform for each of said n×n blocks of sub-images whereby each of said n×n blocks can be represented by a pixel domain transform coefficient and a Hadamard coefficient matrix; and a discrete cosine transform operation.

26. A scalable, reconfigurable memory array method for executing a plurality of preprocessing and post-processing functions for the communication and storage of multimedia articles including voice, high quality audio, text, still image, motion video and animated graphics between multimedia transmitters and receivers, whereby said method is compatible with multiple standard customized coding algorithmic signals including H.261, MPEG, JPEG, EDTV or HDTV, wherein said method provides a scalable architecture for communication of multimedia data, formatting from internal format to external format in compliance with any selective one of a plurality of international standardized and customized coded algorithms, and band width determination of available display band widths according to frame rate and available transmission band widths, said method comprises:

defining of a default internal file format and size based upon coder processing and frame memory system throughput;

selectively receiving an external network algorithmic coded signal and local origination signal;

identifying the multimedia article signal and size;

downsampling the received multimedia article to a predefined internal file format and size;

manipulating said internal file format to conform to transmission band width availability;

distinguishing between motion video foreground articles and still background articles during interframe coding and intraframe coding modes;

upsampling said internal file format to selectively desired format and size for transmission in accordance with transmission band width availability;

distinguishing between motion video foreground articles and still background articles during interframe coding and intraframe coding modes;

upsampling said internal file format to selectively desired format and size for transmission in accordance with transmission band width availability.

27. A scalable, reconfigurable memory array method in accordance with claim 26 wherein said method for manipulating said internal file format to conform to band width availability and distinguishing between motion video foreground articles and still background articles during interframe coding and intraframe coding modes further comprises:

differentiating between still image background pixels and moving foreground pixels;

performing frame differentiating techniques on an n×n pixel block sub-image by means of an m×m array of parallel processors whereby n and m are integers of equal or unequal value;

comparing current frame images to previous frame images and template matching said images;

deriving a motion vector for each of said frame differences;

performing pattern matching, motion estimation, edge detection, feature extraction and Hadamard transform, for each of said n×n blocks of sub-images;

representing each of said n×n blocks of sub-images by a pixel domain transform coefficient, Hadamard coefficient matrix and discrete cosine transform.

28. A method for the application of image preprocessing techniques for the interframe coding of multimedia articles including voice, audio, text, still image, motion video and animated graphics between multimedia transmitters and receivers, whereby said method can be integrated with an image capturer circuit and band width management circuit, said method comprising:

(a) capturing a local origination still image in accordance with frame update requirements established by a host processor;

(b) capturing and storing the complete image frame during the intraframe coding mode;

(c) comparing and differencing said present captured frame to a previous captured frame during the interframe coding mode;

(d) storing the frame differences between said present frame and said previous frame in blocks and macro blocks;

(e) registering and coding said frame differencing blocks or said frame differencing macro blocks into a frame differencing bit map;

(f) converting color space from analog RGB or NTSC format into a digital RGB or YUV format;

(g) retrieving the luminance macro blocks according to said frame differencing bit map;

(h) deriving the appropriate motion vector for each of said macro blocks through comparison and selection of the minimum distortion among adjacent macro blocks;

(i) reducing from an external file format to an internally-defined format in accordance with a downsampling ratio established by said host processor, the reconfiguration unit and the scaler;

(j) translating said frame differencing bit map to conform with said internally-defined format;

(k) performing pixel domain and transform domain coding operations for said frame differencing macro blocks for said Y, U and V format;

(l) enlarging from said internal file format to an external file format according to an appropriate downsampling ratio as established by said host processor, reconfiguration unit and scaler;

(m) adding said frame difference to said previous frame in order to display and update said current frame;

(n) repeating steps (a) through (m) as required;

(o) repeating steps (a) through (n) for live video sequence as required.

29. A method for the application of frame differencing techniques, pixel interpolation techniques and annealing techniques for the compensation of live motion video articles which may include voice, audio, text, still image and animated graphics, said motion compensation method provides a scalable architecture for communication of multimedia data, formatting from internal format to external format in compliance with any selective one of a plurality of international standardized and customized coded algorithms, and band width determination of available display band widths according to frame rate and available transmission band widths, said method comprising:

(a) capturing the scene of a motion video article through frame differencing techniques;

(b) representing the motion video profile of said motion video article in an article-oriented instruction set format;

(c) defining said motion video profile of said motion video article by individual object and relative movement association;

(d) augmenting said motion video profile of said motion video article by means of rotation, shifting and shuffling operations;

(e) reformatting said motion video profile of said motion video article to an internal file format;

(f) enlarging said motion video article by means of upsampling and reducing said motion video article by means of downsampling operations;

(g) overlaying said motion video profile of said motion video article with said voice, audio, text, still image or said animated graphics to construct a complete multimedia presentation;

(h) defining said motion video profile of said motion video article;

(i) interpolating said motion video profile of said motion video article through regeneration of absent pixels to further refine said motion video article;

(j) simulating said motion video profile of said motion video article through capturing and recording selective, nonconsecutive frame references;

(k) annealing said motion video profile of said motion video article through reconstruction of said absent pixels, absent motion articles or absent frames, employing graphics animation techniques;

(l) selectively repeating steps (a) through (k) as required.

30. A communication system assembly apparatus executing a plurality of control, processing, communication and interface functions for the communication and storage of multimedia articles including voice, audio, text, still image, motion video, and animated graphics between multimedia transmitters and receivers whereby said communication system is compatible with multiple standard or customized coding algorithmic signals such as H.261, MPEG, JPEG, EDTV or HDTV wherein multiple incompatible video coding equipment employing different video coding algorithms can communicate with each other, said communication system providing a scalable architecture for communication of multimedia data, formatting from internal format to external format in compliance with any selective one of a plurality of international standardized and customized coded algorithms, and band width determination of available display band widths according to frame rate and available transmission band widths, said communication system providing:

means for network communication processing, said means comprising a network domain decoder and network domain encoder, said means can provide control interface to a telecommunication network or microwave network, said means for network communication processing including receiving functions for serial compressed video bit stream;

means for transmission processing, said means comprising a formatter to transform between a CIF/QCIF format and selective CCITT H.261, MPEG or JPEG formats, said means providing conversion functions for serial to parallel and parallel to serial, said means further comprising means to encode and decode header messages for H.261, JPEG and MPEG;

means for host processing, said means providing a high speed interface between said communication assembly and an external host, said means further providing a system independent communication between said controller assembly and said external host for the exchange sequence of command and data messages, said host means further providing windowing operations permitting the system memory to be memory mapped into a frame memory whereby said host processor can view frame memory status and operations in real time;

means for system host bus, said bus means permitting said host processor to control access and communicate with network communication processors, transmission processors, pixel processors and frame memory;

means for a communication pipelining subsystem, said means providing real time frame formatting, protocol controlling transmission and receiving;

means for pixel processing, said means comprising a bus controller and frame memory controller wherein said pixel processing means serves as a bus master for a video bus wherein said pixel processing means can access frame video memory for pixel level operations, said means further comprising bit level manipulation capabilities for variable length coding and decoding, scan formatting conversion and quantization;

means for display processing, said means for display processing performing digital YUV to digital RGB conversion, digital RGB to analog RGB conversion, digital RGB to VGA conversion and analog RGB to NTSC conversion;

means for capture processing, said means for capture processing permitting decoding of analog video input formats into CCIR 601, said means for capture processing further decoding said CCIR 601 into CIF formulated YUV signals;

means for frame storage, said means for frame storage comprising a twin memory access storage for previous frames and current frames according to a formulated CIF format in order to facilitate frame differencing operations;

means for motion processing, said means for motion processing including a means for loading luminance signal in frame memory for performing motion estimation and generating a motion vector for each block of storage in frame memory;

means for transform processing, said means for transform processing comparing the differences between the previous and the present current blocks or macro blocks and coding said differences in discrete cosine transform coefficients;

means for video bus, said means for video bus providing a high speed, bi-directional, parallel interconnect between said frame memory, said capture processor, said display processor, said transform processor, said pixel processor and said motion processor; and means for video subsystem pipelining, said means comprising system-wide direct interconnection between said capture processor, said pixel processor, said motion processor, said transform processor, said frame memory and said display processor.

* * * * *